(12) United States Patent
Schlamp

(10) Patent No.: US 11,108,816 B2
(45) Date of Patent: Aug. 31, 2021

(54) CONSTRUCTIBLE AUTOMATA FOR INTERNET ROUTES

(71) Applicant: Johann Schlamp, Neuburg a.d. Donau (DE)

(72) Inventor: Johann Schlamp, Neuburg a.d. Donau (DE)

( * ) Notice: Subject to any disclaimer, the term of this patent is extended or adjusted under 35 U.S.C. 154(b) by 41 days.

(21) Appl. No.: 16/085,837

(22) PCT Filed: Mar. 10, 2017

(86) PCT No.: PCT/EP2017/055717
§ 371 (c)(1),
(2) Date: Sep. 17, 2018

(87) PCT Pub. No.: WO2017/157801
PCT Pub. Date: Sep. 21, 2017

(65) Prior Publication Data
US 2019/0098046 A1   Mar. 28, 2019

(30) Foreign Application Priority Data
Mar. 17, 2016   (DE) .......................... 102016204475.3

(51) Int. Cl.
*H04L 29/06* (2006.01)
*H04L 12/715* (2013.01)
*H04L 12/707* (2013.01)

(52) U.S. Cl.
CPC .......... *H04L 63/1466* (2013.01); *H04L 45/04* (2013.01); *H04L 45/22* (2013.01); *H04L 63/1416* (2013.01); *H04L 2463/146* (2013.01)

(58) Field of Classification Search
CPC . H04L 63/1466; H04L 63/1416; H04L 45/22; H04L 45/04; H04L 2463/146
USPC .......................................................... 726/22
See application file for complete search history.

(56) References Cited

U.S. PATENT DOCUMENTS

| | | | | |
|---|---|---|---|---|
| 5,414,833 A | * | 5/1995 | Hershey | H04L 63/145 |
| | | | | 726/22 |
| 7,072,876 B1 | * | 7/2006 | Michael | G06F 21/552 |
| | | | | 706/45 |
| 7,251,215 B1 | * | 7/2007 | Turner | H04L 12/4633 |
| | | | | 370/231 |
| 7,802,094 B2 | * | 9/2010 | Furlong | H04L 63/1408 |
| | | | | 713/160 |
| 7,895,649 B1 | * | 2/2011 | Brook | H04L 63/1441 |
| | | | | 726/22 |
| 9,729,558 B2 | * | 8/2017 | Liu | H04L 63/1441 |

(Continued)

OTHER PUBLICATIONS

Barakat et al., "Deceler les attaques par detournement BGP", Paris Tech, 51-75, 2015.

(Continued)

*Primary Examiner* — Badri Narayanan Champakesan
(74) *Attorney, Agent, or Firm* — Fish & Richardson P.C.

(57) ABSTRACT

In an example method, a computer system retrieves a plurality of data items. Each data item indicates a respective network route on the network. The computer system determines a route automaton based on the plurality of data items. The route automaton includes a representation of the network routes. The computer system determines one or more routing policies on the network based on the route automaton. The method can be used to detect one or more routing policies on a network.

14 Claims, 10 Drawing Sheets

(56) References Cited

U.S. PATENT DOCUMENTS

| | | | | |
|---|---|---|---|---|
| 2003/0074584 A1* | 4/2003 | Ellis | .................... | H04L 63/0272 726/22 |
| 2006/0120137 A1* | 6/2006 | Gould | .................... | G06F 21/554 365/149 |
| 2006/0212942 A1* | 9/2006 | Barford | ............... | H04L 63/1425 726/24 |
| 2009/0006603 A1* | 1/2009 | Duponchel | ......... | H04L 12/4641 709/223 |
| 2010/0115621 A1* | 5/2010 | Staniford | .............. | G06F 21/561 726/25 |
| 2010/0229238 A1* | 9/2010 | Ma | ...................... | H04L 63/1416 726/23 |
| 2010/0251329 A1* | 9/2010 | Wei | .................... | H04L 63/1416 726/1 |
| 2011/0247072 A1* | 10/2011 | Staniford | .............. | G06F 21/566 726/24 |
| 2015/0007312 A1* | 1/2015 | Pidathala | .............. | H04L 63/145 726/22 |
| 2015/0101047 A1* | 4/2015 | Sridhara | ............... | G06F 21/577 726/23 |
| 2015/0101048 A1* | 4/2015 | Sridhara | ................. | G06F 21/55 726/23 |
| 2015/0222653 A1* | 8/2015 | Cabrera | ................ | G06F 21/552 726/23 |
| 2016/0055334 A1* | 2/2016 | Herwono | ............ | H04L 63/1458 726/23 |
| 2017/0230350 A1* | 8/2017 | Enrique Salpico | ......................... | G06F 21/6218 |
| 2019/0098046 A1* | 3/2019 | Schlamp | ................. | H04L 45/04 |

OTHER PUBLICATIONS

International Sear Report and Written Opinion in International Application No. PCT/EP2017/055717, dated Jun. 12, 2017.

Schlamp et al., "Investigating the Nature of Routing Anomalies: Closing in on Subprefix Hijacking Attacks", Traffic Monitoring and Analysis, 15 pages, 2015.

Vervier et al., "Malicious BGP hijacks: Appearances can be deceiving", Communication and Information System Security Symposium, pp. 884-889, 2014.

\* cited by examiner

CONSTRUCTIBLE AUTOMATA FOR INTERNET ROUTES

TECHNICAL FIELD

This disclosure relates to computer networking, and more particular to detecting routing policies on a computer network.

BACKGROUND

An autonomous system (AS) is a collection of routers (e.g., networking devices that forward data packets between computer networks) whose network prefixes and routing policies are under common administrative control. In some cases, an AS can include one or more routers controlled by an organization such as a network service provider, a company, or a university, or a group of organizations.

An AS can be configured to route network traffic to particular nodes within the AS and/or to route network traffic through the AS to another interconnected AS (e.g., to relay data packets to nodes outside of the AS). In some cases, an AS can represent a networked group of nodes (e.g., a group of nodes assigned a particular block of internet protocol (IP) addresses, or IP "prefixes"), and can provide a single routing policy to external systems attempting to access the nodes of the network and/or transmit data packets across the network. For identification, an autonomous system can be assigned a globally unique number (e.g., an autonomous system number (ASN)).

Routers within an AS can use an Interior Gateway Protocol (IGP) to facilitate routing between nodes inside the AS. Routing policy within an AS (e.g., "intra-AS routing") is internal to that AS, and is typically invisible to those outside it. For example, in many cases, the AS administrator determines what routing policy should run within the AS.

To transmit traffic from a node in one AS to a node in another AS, the ASes must be connected. Most ASes do not share a direct link with each other. Thus, to transmit traffic, data packets from one AS may be routed through the networks of one or more other ASes that agree to carry the traffic. An Exterior Gateway Protocol (EGP) is a routing protocol that facilitates routing between multiple ASes (e.g., "inter-AS routing"). In particular, the Border Gateway Protocol (BGP) is a standardized EGP designed to exchange routing and reachability information among ASes on the Internet. BGP disseminates topological reachability using path vectors. For instance, routers advertise feasible paths to adjacent peers, who individually decide on a route to a particular IP prefix based on local policies. Consequently, in BGP, each connected AS establishes a unique view on the Internet backbone.

Routing decisions of individual ASes, however, often cannot be directly observed under BGP, and remain hidden behind the visible path vectors. As a consequence, the analysis of routing policies that determine the observable routing information may be challenging task.

In many cases, AS-level graphs are derived from a given set of routing tables to study global connectivity.

SUMMARY

This disclosure describes the use of formal languages to represent a global routing system (e.g., the Internet) in a rigorous way. Implementations of the Constructible Automata for Internet Routes (CAIR) framework described herein can be used to translate observed BGP paths into a finite route language that allows for the construction of route automata, which fully preserve route diversity. By minimizing these automata, we can obtain equivalence classes where each represent a set of common routing decisions. We can also formally derive implementable search patterns to detect routing paths that are in violation of the observable policies. Further, we demonstrate the effectiveness of CAIR in practice by analyzing route leaks and interception attacks. In empirical experiments, we evaluate public BGP data over the last seven years, study well-known incidents, and identify 22 potential cases of interception.

Implementations of CAIR can provide various technical benefits. For example, implementations of CAIR can enable a computer network to operate more efficiently and more securely. To illustrate, implementations of CAIR can be used to identify one or more routing policies of a network (e.g., to identify the routing policies of one or more ASes or routers on the network) and/or to detect potential problems on the network (e.g., to detect the occurrence of malicious activities on the network, such as interception attacks). Based on this information, potential problems on the computer network can be more readily corrected and/or mitigated. For example, based on this information, a malicious party can be identified to authorities (e.g., to initiate criminal investigation and prosecution). As another example, compromised devices (e.g., network devices that have been hijacked by a malicious user to reroute network traffic improperly) can be identified, and reverted to their uncompromised states. As another example, network traffic can be rerouted around problematic devices, such that it is not intercepted by a malicious party. Thus, the computer network can operate in a secure and efficient manner.

In general, in an aspect, a method can be used to detect one or more routing policies on a network. In the method, a computer system retrieves a plurality of data items. Each data item indicates a respective network route on the network. The computer system determines a route automaton based on the plurality of data items. The route automaton includes a representation of the network routes. The computer system determines one or more routing policies on the network based on the route automaton.

Implementations of this aspect can include one or more of the following features.

In some implementations, determining the one or more routing policies on the network can include identifying a malicious routing activity on the network. Identifying the malicious routing activity on the network can include identifying an interception attack associated with at least one autonomous system on the network. The interception attack can correspond to a selective rerouting of network traffic by an autonomous system with respect to a subset of network prefixes of the network.

In some implementations, each data item can include an indication of a network prefix associated with a particular network route, and an indication of one or more autonomous system along the particular network route.

In some implementations, each data item can include an indication of a destination Internet Protocol (IP) address associated with a particular network route, and an indication of one or more IP addresses of routers along the particular network route.

In some implementations, retrieving the plurality of data items can include retrieving one or more network routing tables associated with the network.

In some implementations, retrieving the plurality of data items can include performing one or more IP-based measurements of the network.

In some implementations, the route automaton can define a plurality of states. Each state can be associated with a respective routing policy of an autonomous system on the network.

In some implementations, the route automaton can define a plurality of states. Each state can be associated with a respective routing policy of a router on the network.

In some implementations, the method can further include representing the plurality of network routes using a finite route language. The finite route language can include a plurality of symbols. A particular network route can be represented by a word of the finite route language. The word can be defined by a sequence of symbols of the finite route language. Each symbol of the finite route language can include at least one of an indication of a network prefix, an indication of an autonomous system, and an indication of an IP address.

In some implementations, determining the route automaton can include determining a deterministic finite-state automaton based on the plurality of data items. The deterministic finite-state automaton can include a plurality of states and a plurality of paths between the states. Determining the route automaton can also include performing a minimization operation with respect to the deterministic finite-state automaton. Performing the minimization operation with respect to the deterministic finite-state automaton can include combining two or more states associated with a similar routing policy. Performing the minimization operation with respect to the deterministic finite-state automaton can include reducing a number of states of the deterministic finite-state automaton such that the deterministic finite-state automaton includes a minimum number of unique states necessary to represent each of the network routes.

In some implementations, the route automaton can define a plurality of directional paths between the states. Identifying the malicious network activity on the network can include identifying a particular network route associated with a sequence of n or greater states. A single respective outgoing path can extend from each state in the sequence. In some implementations, n can be at least three.

In some implementations, the method can further include identifying a particular autonomous system associated with the malicious network activity based on the route automaton.

In general, in another aspect, a system includes one or more processors, and non-transitory computer readable medium storing instructions operable to cause one or more processors to perform various operations. The operations include retrieving a plurality of data items by a computer system. Each data item indicates a respective network route on the network. The operations also include determining, by the computer system, a route automaton based on the plurality of data items. The route automaton includes a representation of the network routes. The operations also include determining, by the computer system, one or more routing policies on the network based on the route automaton.

Implementations of this aspect can include one or more of the following features.

In some implementations, determining the one or more routing policies on the network can include identifying a malicious routing activity on the network. Identifying the malicious routing activity on the network can include identifying an interception attack associated with at least one autonomous system on the network. The interception attack can correspond to a selective rerouting of network traffic by an autonomous system with respect to a subset of network prefixes of the network.

In some implementations, each data item can include an indication of a network prefix associated with a particular network route, and an indication of one or more autonomous system along the particular network route.

In some implementations, each data item can include an indication of a destination Internet Protocol (IP) address associated with a particular network route, and an indication of one or more IP addresses of routers along the particular network route.

In some implementations, retrieving the plurality of data items can include retrieving one or more network routing tables associated with the network.

In some implementations, retrieving the plurality of data items can include performing one or more IP-based measurements of the network.

In some implementations, the route automaton can define a plurality of states. Each state can be associated with a respective routing policy of an autonomous system on the network.

In some implementations, the route automaton can define a plurality of states. Each state can be associated with a respective routing policy of a router on the network.

In some implementations, the operations can further include representing the plurality of network routes using a finite route language. The finite route language can include a plurality of symbols. A particular network route can be represented by a word of the finite route language. The word can be defined by a sequence of symbols of the finite route language. Each symbol of the finite route language can include at least one of an indication of a network prefix, an indication of an autonomous system, and an indication of an IP address.

In some implementations, determining the route automaton can include determining a deterministic finite-state automaton based on the plurality of data items. The deterministic finite-state automaton can include a plurality of states and a plurality of paths between the states. Determining the route automaton can also include performing a minimization operation with respect to the deterministic finite-state automaton. Performing the minimization operation with respect to the deterministic finite-state automaton can include combining two or more states associated with a similar routing policy. Performing the minimization operation with respect to the deterministic finite-state automaton can include reducing a number of states of the deterministic finite-state automaton such that the deterministic finite-state automaton includes a minimum number of unique states necessary to represent each of the network routes.

In some implementations, the route automaton can define a plurality of directional paths between the states. Identifying the malicious network activity on the network can include identifying a particular network route associated with a sequence of n or greater states. A single respective outgoing path can extend from each state in the sequence. In some implementations, n can be at least three.

In some implementations, the operations can further include identifying a particular autonomous system associated with the malicious network activity based on the route automaton.

The details of one or more embodiments are set forth in the accompanying drawings and the description below.

Other features and advantages will be apparent from the description and drawings, and from the claims.

DESCRIPTION OF DRAWINGS

FIG. 2A illustrates a regular traffic flow over an example network.

FIG. 2B illustrates traffic flow over the network during an interception attack.

FIG. 9A shows absolute changes in the number of states and transitions in CAIR and the network graph. FIG. 9B shows relative changes in the number of states and transitions in CAIR and the network graph.

DETAILED DESCRIPTION

Figure 1A:
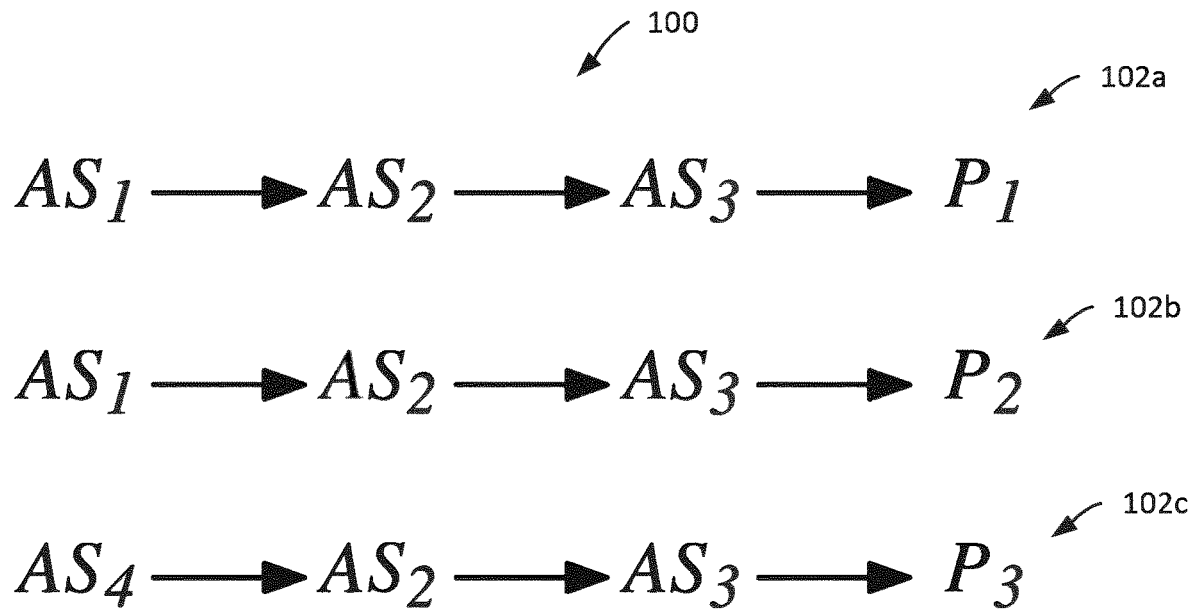
FIGS. 1A-D show representations of distributed routes for prefixes by an example autonomous systems.

Measuring, modeling, and analyzing routing between Autonomous Systems (ASes) has gained increasing importance over the last decade, as the Internet infrastructure became business critical and investigations of cyber security incidents intensified. The question of route integrity is prevalent in day-to-day operations and a clear notion of path selection in the Internet is urgently needed to detect anomalies.

However, the analysis of policy-based routing is often challenging since its underlying rules cannot be directly observed. For example, the Border Gateway Protocol (BGP) selects best paths from a pool of available paths that are received via neighboring routers. Local policies are enforced to influence the route selection, e.g., to meet business constraints. Redistributed path vectors represent the outcome of this decision process, which effectively hides operational semantics from observers. A collection of all the available paths is essentially what we can learn at any given observation point. AS-level network graphs extracted from these paths may serve to study global inter-AS connections. In practice, however, ASes often comprise several points-of-presence as well as numerous BGP routers and are interconnected in complex ways. Network routes are redistributed on a per-prefix basis and are only valid in the context of individual routers. For the analysis of routing policies, we accordingly need an expressive model of the observable inter-AS routing space.

In this application, we introduce Constructible Automata for Internet Routes (CAIR) to analyze BGP path vectors in a context-preserving way. Our framework provides an accurate representation of the inter-domain routing based on route automata, which strictly adhere to the observable information. CAIR overcomes traditional models in which an AS is considered an atomic entity with a consistent route selection policy. Our approach is well-suited to study selectively redistributed paths resulting from traffic engineering or geographically dispersed ASes.

By minimizing route automata, we are able to transform path data into policy-induced equivalence classes (e.g., by consolidating routing paths that share the same propagation characteristics). With CAIR, we can precisely formulate and evaluate prefix-based policy constraints. Practical search patterns allow to detect deviations in the set of observable routing policies, which, for instance, result from route leaks or interception attacks. CAIR can be readily deployed by AS operators to monitor the propagation of their prefix announcements.

After illustrating common difficulties in measurement-based routing analysis, we introduce CAIR and the concept of finite route languages to model network paths and show how it can be leveraged in practice using minimized automata. We apply CAIR to derive formal search patterns for policy violations and routing attacks. We focus on two intricate anomalies. First, we study interception attacks, in which an adversary maliciously attracts traffic while maintaining a backhaul path to relay eavesdropped packets. Second, we evaluate (ab)normal routing changes to gain insight into customer ASes that erroneously advertise transit in a so-called route leak. We validate our approach with well-known incidents and identify 22 potential cases of interception. In the remainder, we show how operators and researchers can benefit from our approach and discuss related work. We study technical details of CAIR later on.

Motivation

Figure 1B:
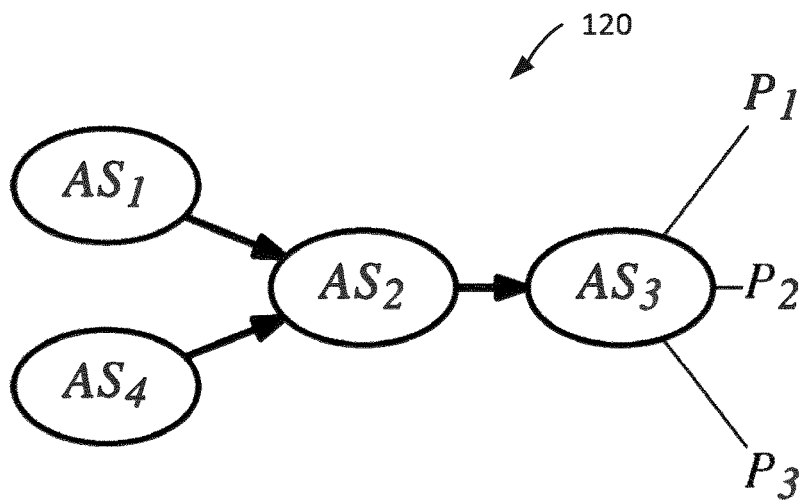

We approach CAIR by describing a fundamental gap we currently face in routing analysis using the example of traditional network graphs. We then illustrate with some background how an approach based on formal languages and automata can close this gap.
The Need for CAIR With CAIR, we intend to study the propagation of network routes by analyzing BGP routing tables. Consider a subset 100 of such a routing table that includes AS paths 102a-c to three network prefixes $P_{1-3}$ originated by $AS_3$ as shown in FIG. 1A. A complete list of all paths naturally preserves the observable routing decisions but is difficult to analyze for a larger number of network paths. A common way to represent such routing data is to construct an AS graph (e.g., a graph 120, as shown in FIG. 1B). This graph 120, however, implies transitivity, e.g., it also models a route $AS_1 \rightarrow AS_2 \rightarrow AS_3 \rightarrow P_3$ that has not been observed. CAIR offers a context-sensitive data model to preserve such per-prefix routing policies.
Overview of CAIR We define a finite route language over an alphabet of AS numbers and prefixes. Words in this language represent network routes. For a given set of routes, we construct a route automaton accepting the respective language such that each transition (edge) is labeled with either an AS number or a prefix.

A route automaton is a mathematical model of the network routes. The route automaton is a state-based model, and defines one or more finite number of states and transitions between those states (i.e., "edges"). At any given moment, the route automaton can be in exactly one of states, and can transition between states along the edges in response to one or more inputs. In some cases, a route automaton can be defined by a list of its states, its initial state, and the conditions for each transition. In some cases, an automaton can be referred to as a finite-state machine, or finite-state automaton, a finite automaton, or a state machine.

Traversing edges until the final, accepting state of the automaton results into an exact list of the original routes. Since any finite language can be represented by such a deterministic finite-state automaton (DFA), route automata accurately model path data without introducing additional information. Further, any DFA can be minimized to a unique automaton defined by a minimum number of states. These states then represent equivalence classes such that all partial words leading to a particular state share a common set of valid suffixes.

Figure 1C:
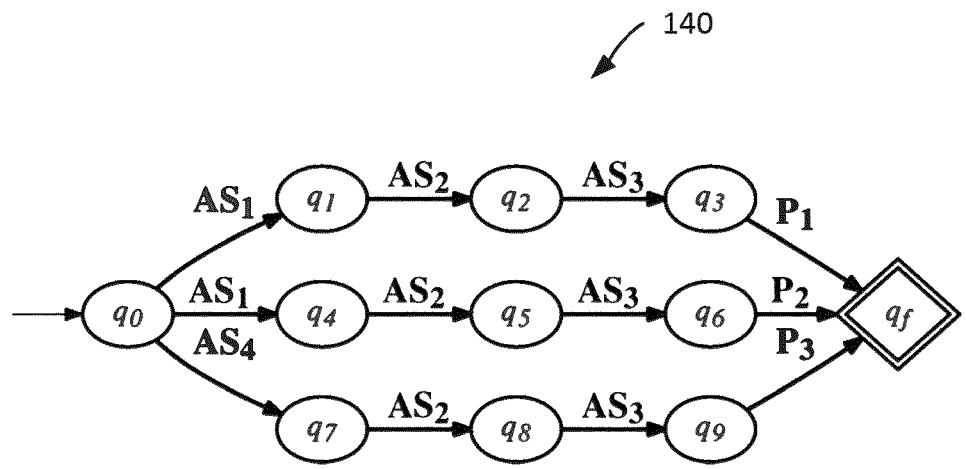
Figure 1D:
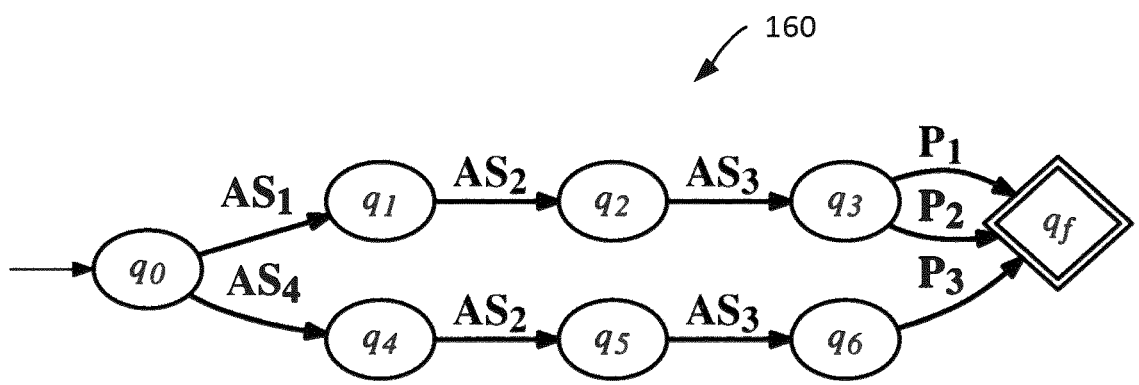

Applied to routing analysis, each state in a minimal route automaton maps to a unique set of routing decisions. In essence, the automaton merges (partial) routes that uniformly propagate the Internet. Prefix announcements that are redistributed along different paths, in contrast, lead to independent states in the minimized automaton. For our example in FIG. 1A, corresponding DFA 140 and minimal DFA (MDFA) 160 are shown in FIG. 1C and FIG. 1D, respectively. In the minimized automaton, we obtain a sequence of unique states ($q_1$, $q_2$, $q_3$) and ($q_4$, $q_5$, $q_6$), which accurately reflects the selective redistribution of routes to the prefixes $\{P_1, P_2\}$ and $\{P_3\}$ at $AS_2$.

It is worth noting that CAIR is not designed to improve on the incompleteness of measured BGP data nor to predict unknown routes. Instead, we propose a data structure that correctly represents observed routing paths and is capable to reveal the underlying routing decisions at the same time.

Benefits of Using Finite Automata

CAIR is a natural choice to overcome modeling artifacts in traditional network graphs that arise from the implicit assumption of transitivity. In addition, using minimized automata to analyze network routes can provide various benefits. For example:

Accuracy.

Route automata accurately reflect the observable routing system. CAIR is well-suited to analyze specific routing tables collected at individual ISPs as well as comprehensive data sets stemming from public route collectors.

Efficiency.

Any DFA can be minimized. This results in a highly efficient way to represent a finite language and, consequently, the set of network routes we model with it. CAIR can be deployed to monitor live streams of BGP updates and in retrospective on archived routing tables.

Expressiveness.

Each state in a minimized route automaton reflects a unique set of common routing decisions. CAIR exploits this fact to support the analysis of routing policies. It can be used to evaluate the competitiveness of transit ASes or the root cause of abnormal route updates.

We believe that CAIR is a valuable tool for routing analysis that can be used by individual AS operators to identify anomalous propagation of their network routes.

Motivating Example: Interception Attacks

Interception attacks are characterized by a subtle manipulation of network routes in order to redirect traffic destined for a victim to an attacker. We focus on a man-in-the-middle variant, in which the attacker relays all eavesdropped communication on to the victim. Implementing such an attack in the Internet is feasible and has been demonstrated in practice. An attacker can craft falsified routes to advertise reachability of a victim's network, also called a hijacking attack. One of the attacker's upstream ISPs is utilized to preserve a backhaul path towards the victim. To this end, the attacker fabricates route updates with an AS path including all ASes on the path to his victim, which must then discard corresponding announcements due to loop prevention in BGP.

Figure 2A:
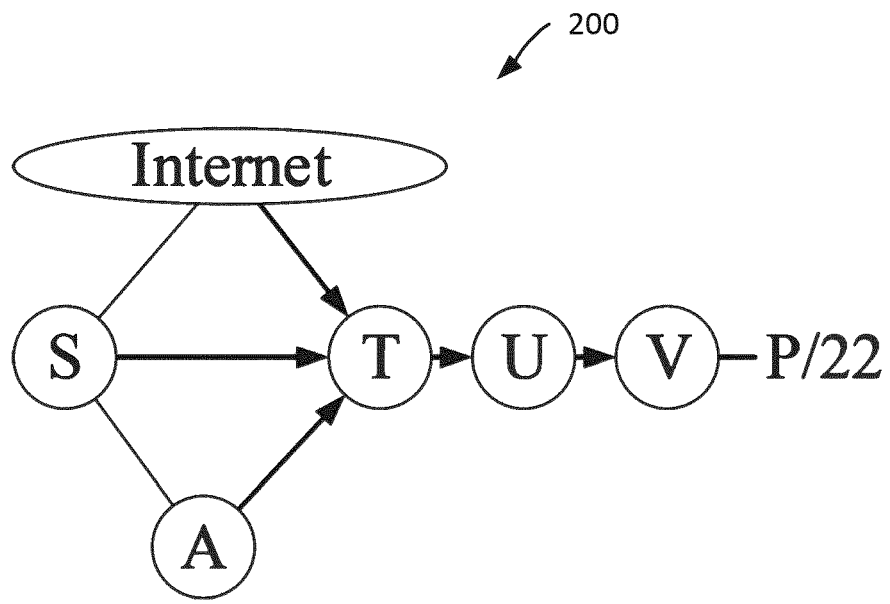
FIGS. 2A and 2B illustrate the change in traffic forwarding during an interception attack.
Figure 2B:
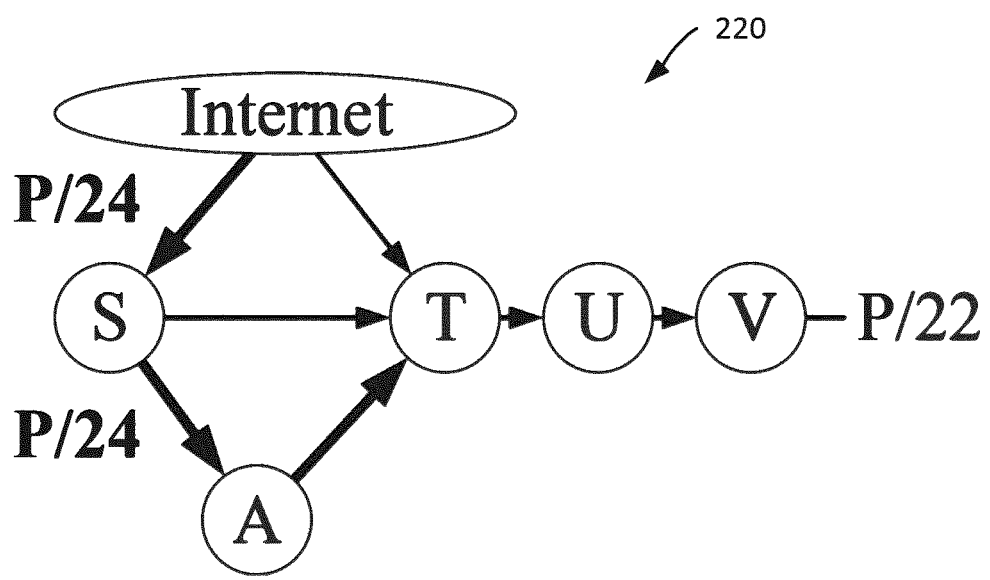

FIGS. 2A and 2B illustrate the change in traffic forwarding during such an example interception attack. FIG. 2A illustrates a regular traffic flow 200 over an example network. FIG. 2B illustrates traffic flow 220 over the same network during an interception attack. With CAIR, we aim to detect corresponding malicious route updates. A key observation to derive a search pattern is that an artificial subpath over the attacker emerges. From a BGP policy point of view, the attack on V induces nonuniform routing decisions at S for the prefixes P/22 and P/24. While S forwards traffic to the prefix under attack, via the malicious AS A, it reaches all other prefixes of the victim directly via T. Hence, the subpath S→A→T to P/24 contradicts the direct route S→T to P/22. This anomaly will be represented by a series of distinct, detectable states in our route automaton.

The CAIR Framework

A finite language consists of characters and rules to construct words, which can be represented by a deterministic finite-state automaton. In the following, we understand a given set of network routes as such a finite language and use it as input data to construct a route automaton.

Finite Route Languages

The global routing system can be represented as all active BGP routes (e.g., as a set of AS paths from all vantage points towards all advertised IP prefixes). According to formal language theory we can define a Finite Route Language (FRL) as follows.

Definition

Let $\Sigma_{AS}$ be the set of all ASes, $\Pi$ the set of all IP addresses, $p \subset \Pi$ an IP prefix, and $p' \subset p$ a more specific prefix of p. Let further be (w, p)$\in \Sigma^*_{AS} \times \mathcal{P}(\Pi)$ a route with an AS path $w \in \Sigma^*_{AS}$, i.e., an arbitrary concatenation of ASes, to a prefix $p \subset \Pi$, in the following denoted r=wp. Then, we define the finite route language $\mathcal{L} \subset \Sigma^*_{AS} \times \mathcal{P}(\Pi)$ as the set of all routes to all advertised prefixes present in the global routing system. $\mathcal{L}_c \subset \mathcal{L}$ denotes the subset of routes that is observable at a given observation point $c \in \Sigma_{AS}$. We further define $\mathcal{L}(p) \subset \mathcal{L}$ as the subset of routes to a given prefix $p \subset \Pi$ such that $$\mathcal{L}(p) = \{wuop \in \mathcal{L} \mid w \in \Sigma^*_{AS}; u \in \Sigma_{AS}; o \in \Sigma_{AS}\}$$

with w being an AS subpath and u the upstream AS of the origin AS o. For a given route r and a subprefix $p' \subset p$ that is not explicitly advertised, we postulate $r \subset \mathcal{L}(p) \Rightarrow r \subset \mathcal{L}(p')$ as a corollary, since routes to less specific prefixes also cover more specific prefixes. Note that the converse is false. We reuse the unary operator |.| to indicate the number of routes in a set $\mathcal{O} \subseteq \mathcal{L}$, the length of a route $r \in \mathcal{L}$ or a subpath $w \in \Sigma^*_{AS}$ and the number of ASes in a set $S \subseteq \Sigma_{AS}$.

Route Automata

We use a deterministic finite-state automaton to represent a formal language. Processing one of its words ends in an accepting state of the automaton. We define a route automaton as the minimal deterministic finite-state automaton that accepts a finite route language. Let $\mathcal{L} \subset \Sigma^*_{AS} \times \mathcal{P}(\Pi)$ be the FRL representing all routes in the global routing system. Then, we define its route automaton as the 5-tuple $$M = (Q, \Sigma_{AS} \cup \mathcal{P}(\Pi), \delta, q_0, F)$$

with Q a finite set of states, $q_0 \in Q$ the start state, $F \subset Q$ a set of accepting states, and $\delta$ a partial mapping $\delta: Q \times (\Sigma_{AS} \cup \mathcal{P}(\Pi)) \to Q$ denoting transitions. We define the extended transition function $\delta^*$ for routes $ur \in \mathcal{L}$ as the mapping $\delta^*: Q \times \mathcal{L} \to Q$ such that $$\delta^*(q, \varepsilon) = q$$

$$\delta^*(q, ur) = \begin{cases} \delta^*(\delta(q, u), r) & \text{if } \delta(q, u) \neq \bot \\ \bot & \text{otherwise} \end{cases},$$

with $u \in \Sigma_{AS}$, $r \in \Sigma^*_{AS} \times \mathcal{P}(\Pi)$ a partial route, $q \in Q$, $\varepsilon$ an empty path, and $\bot \in Q$ a catching state that represents nonexistent routes. In essence, $\delta^*$ describes a function to traverse the automaton along a given network route. We further define $\mathcal{L}(M)$ as the language accepted by an automaton M as $$\mathcal{L}(M) = \{r \in \mathcal{L} \mid \delta^*(q_0, r) \in F\}.$$

Then, $M_c$ denotes an automaton accepting a set of routes $\mathcal{L}_c \subset \mathcal{L}$ observed by an individual observation point $c \in \Sigma_{AS}$ such that $\mathcal{L}(M_c) = \mathcal{L}_c$.

All states $q \in Q$ that accept the same path segments are equivalent and can be merged into a single state. Iteratively applied, this process leads to a minimal automaton. It is unique up to isomorphisms and requires a minimum number of states among all automata that accept the same language. Note that the number of accepting states in such a route automaton is $|F|=1$, since all routes $r \in \mathcal{L}$ end with an IP prefix. In the following, we use $q_f$ to refer to this single accepting state.

Minimization in CAIR

The most basic algorithms to minimize automata have a complexity of up to $\mathcal{O}(|\Sigma_{AS} \cup \mathcal{P}(\Pi)| \cdot |Q|^2)$. Although more efficient algorithms may exist, the size of our intended input data (e.g., the number of words), greatly exceeds that of common use cases in language processing. For comparison, the English alphabet consists of 26 letters, whereas the size of the routing alphabet is currently given by $|\Sigma_{AS}| + |\mathcal{P}(\Pi)| \approx 52,000 + 600,000$. To efficiently construct a minimal route automaton, we adopt a special-purpose algorithm that incrementally minimizes the automaton during construction without ever holding the full non-minimized automaton in memory. Its memory complexity is $\mathcal{O}(|Q_m|)$, where $|Q_m|$ is the number of states in the minimized automaton. The algorithm is able to randomly add or remove routes, whereas common minimization algorithms need to re-minimize the automaton at each change of data. Further implementation details can be found later on.

Incident Detection with CAIR

The concept of finite route languages allows us to formalize policy anomalies. In the following, we will show how to detect two example anomalies using route automata.

Formalization of Routing Attacks

BGP-based routing attacks are generally defined by illegitimate route updates that alter the global routing system in order to modify traffic flows. Corresponding route injections are considered illegitimate if they violate topological objectives or contradict the intended routing policies of individual ASes.

Attacker Model.

Our attacker is assumed capable of injecting arbitrary BGP messages into the global routing system (e.g., he operates a router and maintains a BGP session to at least one upstream provider). The attacker is not hindered by local filters nor other validation mechanisms deployed by his upstream ISP. Instead, the upstream ISP indifferently redistributes all update messages to its peers, allowing them to propagate throughout the Internet. An observation point shall be in place to monitor the propagation of BGP messages. Note that route updates with less attractive paths may not reach a particular observation point due to best path selection in BGP. For the following definitions, an observation point capable of observing all routes in $\mathcal{L}$ is assumed. We discuss practical aspects regarding the choice of observation points later on.

Generic Routing Attack.

Let $a \in \Sigma_{AS}$ denote the attacker AS, $v \in \Sigma_{AS}$ the victim AS, and $p_v \subset \Pi$ the prefix of the victim. Then, a generic routing attack extends the set of valid routes $\mathcal{L}$ by injecting forged routes $\mathcal{F}_a$ into the routing system such that the altered set of observable routes $\hat{\mathcal{L}}(p'_v)$ reads $$\hat{\mathcal{L}}(p'_v) = \mathcal{L}(p_v) \cup \mathcal{F}_a(p'_v) \text{ with } p'_v \subseteq p_v.$$

After convergence in BGP, some (or all) of the original routes in $\mathcal{L}(p'_v)$ will be invalidated and replaced by redistributed routes of the attacker. In general terms, the attacker advertises reachability of a victim's network—either entirely or in parts—and may thus attract a fraction of the victim's inbound traffic.

Application to Interception Attacks

Interception attacks in BGP succeed if data packets sent to a victim are rerouted via the AS of the attacker. To forward the redirected packets on to his victim, an attacker needs to maintain a stable backhaul path. With CAIR, we can precisely describe these incidents. Recall our finding that artificial path segments emerge over the attacker, which appear to be the result of nonuniform routing decisions. Such anomalies are difficult to detect from a topological point of view, since only new subpaths over already existing connections emerge. By using FRLs, we can derive an appropriate model for such a violation of routing policies and subsequently translate this model into a generic search pattern for route automata.

Artificial Path Segments.

In an interception attack, an attacker $a \in \Sigma_{AS}$ advertises routes to (a part of) a victim's prefix $p_v \subset \Pi$ with $v \in \Sigma_{AS}$ while including a backhaul path in his route announcements. As a BGP speaker, the attacker can easily identify such a path to $p_v$ in his routing table $\mathcal{L}_a(p_v)$. The set of AS paths that represent a suitable backhaul link via one of the attacker's upstream ASes is given by $$W_v^a = \{w \in \Sigma^*_{AS} \mid wp_v \in \mathcal{L}_a(p_v); w \in \Sigma^*_{AS}\}.$$

His remaining upstream ISPs are utilized to launch a particular (sub)prefix hijacking attack against $p'_v \subseteq p_v$ such that $$\hat{\mathcal{L}}(p'_v) = \{w_v p_v \mid w_v \in \Sigma^*_{AS}\} \cup \{w a w_v^a p'_v \mid w \in \Sigma^*_{AS}; w_v^a \in W_v^a\}.$$

As outlined earlier, the attack does not lead to suspicious topological changes: both the observable origin and upstream ASes of $p_v$ and $p'_v$ remain unchanged since they are identical in $w_v$ and $w_v^a$. The attacker's forged route to $p'_v$ merely creates the impression that it originated at the victim's AS v and propagated via the victim's legitimate upstream providers (as well as theirs). We denote this common path segment $w_c \in \Sigma^*_{AS}$ such that $w_v^a = w w_c$ and $w_v = \tilde{w} w_c$ with $w, \tilde{w} \in \Sigma^*_{AS}$.

Translation to Route Automata.

Figure 3:
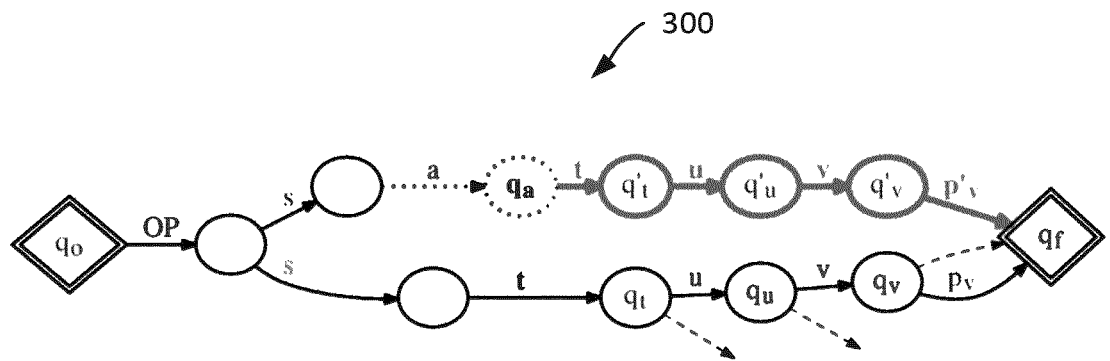
FIG. 3 shows a route automaton for an example interception attack.

FIG. 3 shows a route automaton 300 for the attack presented in FIGS. 2A and 2B as observed from an observation point OP. The automaton state $q_t$ represents the set of valid transit routes redistributed by t including routes that propagate via u and v (as indicated by dashed lines). By fabricating an artificial path segment $tuv = w_v^a \in \Sigma^*_{AS}$, the attacker seemingly changes the routing policy of t. It now appears that t selectively forwards announcements of $p'_v$ to a in a nonuniform way. Since none of the other transit routes of t propagate along this path, the automaton needs to employ separate states $\{q_t, q'_t\}$, $\{q_u, q'_u\}$, and $\{q_v, q'_v\}$ that cannot be merged. Note that the attacker could easily hide his own AS number in the forged route updates (remove dotted elements).

Detection Pattern.

To detect interception attacks, we need to search for a partial route that (i) exhibits artificial propagation characteristics and (ii) contradicts existing announcements. These conditions can be easily implemented as follows.

Artificiality.

We search a given route automaton for a partial network path $w_v^a$ defined by a sequence of states $(q_a, \ldots, q'_v)$ such that $\delta^*(q_a, w_v^a) = q'_v$ with a single outgoing transition for each state. Such a path is of limited practical relevance since only a single prefix announcement propagates along its way. In some cases, we can detect interception attacks by identifying a sequence of n or more states with a single outgoing transition for each state (e.g., three or more, four or more, five or more, etc.).

Nonuniformity.

We further search for an independent series of states defined by a competing path segment $w_v$ such that $\exists q \in Q$: $\delta^*(q, w_v) = q_v$. The length $|w_c|$ of the common suffix of $w_v^a$ and $w_v$ corresponds to the distance to v at which a selective, i.e., nonuniform routing decision occurs. If $|w_c| = 0$, the affected prefixes are announced by multiple origin ASes (MOAS). For $|w_c| = 1$, v selectively redistributes its announcements to different upstream ISPs. The value of $|w_c|$ for raising suspicion depends on the peculiarities of v, e.g., its multi-homing and traffic shaping strategies as well as its geographic extension. It might also be different for individual prefixes of v. Any ISP that deploys CAIR has this information readily available within the policy definitions for its prefixes.

In a final step, we verify if the offending state $q'_v$ represents a (sub)prefix announcement of $q_v$. We then raise an interception alert and report the affected prefixes $p_v$ and $p'_v$ as well as the path segment $w_v^a$ for further investigation.

Pinpointing the Attacker.

With our route automaton, we can also pinpoint an attacker's location in the Internet topology. If the attacker adds his AS number a to the BGP updates, we can directly observe a transition labeled with a that points to the offending state $q_a$. Under the assumption that the attacker is taking precautionary measures to hide his AS number as outlined above, the incoming and outgoing transitions of $q_a$ represent the attacker's set of upstream ISPs. By cross-checking their common customers, this leaves us with a small number of possible ASes to be manually scrutinized.

Assessment of Route Leaks

To further demonstrate the expressiveness of CAIR, we derive a simple yet effective metric to assess route leaks. In its most basic form, a route leak is given by a multi-homed AS, in the following called the originator, who (accidentally) re-advertises its full routing table into BGP. Upstream ISPs often prefer customer routes and thus redistribute the corresponding BGP announcements. The result is a major shift in global Internet traffic such that packet flows are now redirected towards the originator. While a route leak leads to significant activity in BGP, it leaves individual AS links intact. Again, we need a policy-aware data model for the analysis of such events. CAIR is a natural fit to this problem.

A Measure for Routing Dominance.

In order to assess the routing changes imposed by route leaks, we introduce a metric for routing dominance. Recall that each state $q \in Q$ in our minimized automaton represents an equivalence class, i.e., a set of partial routes accepted by q. We extend this abstract concept to ASes $u \in \Sigma_{AS}$ as follows. $\vec{Q}(u)$ yields the set of all states that are reachable via transitions labeled with u, i.e., $$\vec{Q}(u) = \{\vec{q} \in Q | \delta^*(q, uw) = \vec{q}, q \in Q \backslash \{q_f\}, w \in \Sigma^*_{AS}\}.$$

The size of $|\vec{Q}(u)|$ implicitly represents the number of partial routes over AS u. The larger this set is for a given AS, the more of its advertised routes are preferred and redistributed by its peers (as well as theirs) (e.g., the more it dominates routing in BGP). During a route leak, we expect a massive change in routing dominance for individual ASes and, above all, for the originator. We can easily implement this detection pattern in CAIR and use it to evaluate the impact of a given route leak.

Although CAIR is described in the context of ASes (e.g., to determine the routing behavior of interconnected ASes), this is merely an illustrative example. In practice, CAIR can be used to detect routing policies in a variety of different contexts. For example, in some cases, CAIR can be used to detecting routing policies of one or more routers (e.g., by collecting information regarding IP routes between interconnected routers, constructing a route automaton based on the collected information, and determining the routing behavior of the routers based on the information). Thus, CAIR is not limited solely to ascertaining the behavior of ASes on a network, and instead can be used to ascertain the behavior of any traffic-routing device on the network.

Evaluation

CAIR can be used as a practical tool for ISPs to analyze the propagation of their prefix announcements. To illustrate the benefits of CAIR, we evaluated CAIR for all ASes present in the global routing system over a time frame of seven years. First, we applied our detection scheme for interception attacks and revealed 22 potential incidents so far unknown whose victims mostly belong to the R&D sector and to the medium-sized ISP business. Details regarding two case studies including a well-known ground truth attack presented at DEFCON are described herein. Second, we applied our measures to study the routing dominance of ASes and evaluate their characteristics over time. A comparison between our results and the sudden and radical routing change during a recent route leak of Telekom Malaysia is also described herein.

Detecting BGP Interception Incidents

We used CAIR to construct a series of route automata based on BGP routing tables published by the RouteViews Oregon2 collector from August, 2008 until November, 2015. We sampled this time frame by constructing one route automaton every two weeks, i.e., we evaluate 174 routing information bases (RIBs) with a total of ≈2.4 B entries.

Overview.

For our evaluation, we made the assumption that an AS cannot influence routing decisions beyond its upstream ASes. We accordingly required $|w_c|>2$ to raise suspicion for an interception attack. With this approach, we ruled out that an affected AS could have deliberately advertised its prefixes in a nonuniform way. For practical deployments with ground truth data available at individual ISPs, we recommend lowering this threshold to allow for the detection of local attacks. To compensate for a limited number of observable routes provided by the route collector, we further limited our analysis to strict subprefix hijacking, which is generally visible in the default-free zone. We discuss the implications for a practical deployment by ISPs later on.

Figure 4:
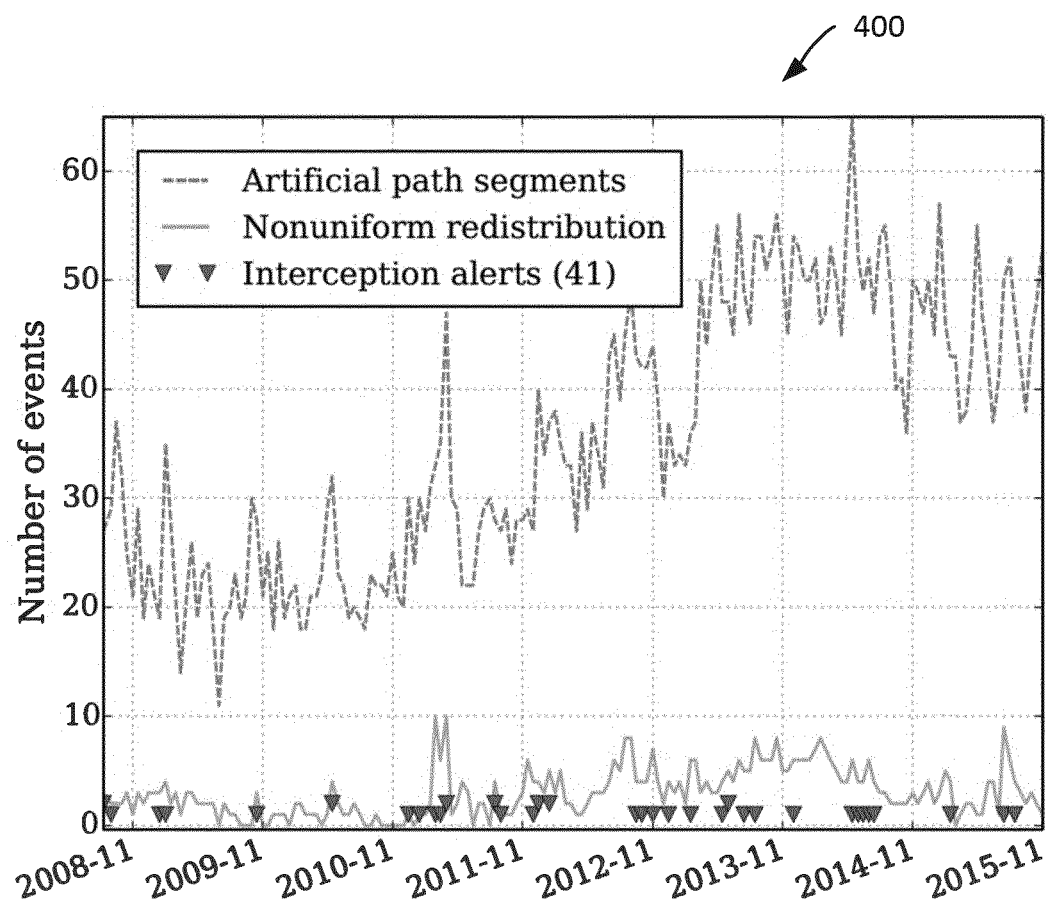
FIG. 4 is a plot of a number of interceptions alerts raised over a period of time.

In total, we identified 6,171 artificial path segments $w_v^a$. For 527 of them, we found a competing segment $w_v$ that evidenced a nonuniform redistribution of BGP updates. Our detection scheme finally raised 41 alerts for (strict) subprefix hijacking attacks. Table 1 presents the results. Note that one of these events lasted for 8 weeks, i.e., accounts for four subsequent alerts. Additional five events were observed twice. This left us with a total number of 32 distinct cases. In FIG. 4, we summarize these observations over time in a plot 400 (showing a number of interceptions alerts raised over a period of time).

TABLE 1

| Interception alerts raised by CAIR. | | |
|---|---|---|
| Aug. 10, 2008-Nov. 1, 2015 | total | in % |
| Artificial path segments $w_a^v$ | 6,171 | 100.0% |
| Nonuniform redistribution | 527 | 8.54% |

TABLE 1-continued

| Interception alerts raised by CAIR. | | |
|---|---|---|
| Aug. 10, 2008-Nov. 1, 2015 | total | in % |
| Interception alerts | 41 | 0.66% |
| Unique alerts (victims) IRR inspection | 32 | 0.52% |
| Sibling ASes (victim) | −7 | 0.11% |
| Sibling ASes (upstream) | −2 | 0.03% |
| Remaining alerts | 23 | 0.37% |

Sanitizing False Positives.

Our search pattern for interception attacks can lead to false positive alarms in two cases. First, we might falsely classify path segments as artificial due to a limited number of observed routes. We will discuss the importance of selecting suitable observation points later on. Second, contradictory routing policies could be intended as such by an alleged victim. Although we already excluded cases with $|w_c|\leq 2$, the victim could still influence route selection remotely, e.g., via BGP communities, if some ASes in $w_v^a$ are under a single administrative control. We used IRR databases to assess the interception alerts and were able to identify 9 benign cases.

Reported Alerts.

We summarize the remaining 23 alerts in Table 2. Entries that are in italic and bold represent upstream ASes s that redistribute nonuniform BGP updates, while the ASes t represent upstream links to maintain backhaul paths. The underlined parts of the AS paths show the artificial segment $w_v^a$. In 13 cases, the competing path segment $w_c$ is of length 3 (plus the two upstreams and possibly further intermediate ASes), while 6 cases exhibit a segment length of 4 AS hops. The 4 remaining incidents show longer segments. We also checked AS names in the WHOIS system. Some of these events occurred several years ago. We consequently utilized archived WHOIS data for the respective dates.

TABLE 2

| Remaining interception alerts after IRR inspection. | | | | | | | |
|---|---|---|---|---|---|---|---|
| Date | | Forged AS path/nonuniform route segment | | | | Victim | country/company |
| 2008 Aug. 10 | | *AS26627* | AS4436 | AS22822 | AS23005 | AS20195 | United States, Sparkplug Las Vegas |
| 2009 Feb. 1 | *AS3303* | AS1299 | AS701 | AS3491 | AS37004 | AS30988 | Nigeria, IS InternetSolutions |
| 2009 Oct. 15 | *AS3561* | AS7018 | AS4837 | AS4808 | AS17431 | AS17964 | China, Beijing Network Technologies |
| 2010 May 15 | *AS2914* | AS3549 | AS3356 | AS23148 | AS20080 | AS1916 | Brazil, Rede Nacional de Ensino e Pesquisa |
| 2010 Dec. 15 | | *AS34984* | AS12301 | AS3549 | AS9121 | AS12794 | Turkey, Akbank |
| 2011 Jan. 15 | *AS9002* | AS21230 | ..(+2).. | AS3356 | AS9121 | AS44565 | Turkey, Vital Teknoloji |
| 2011 Mar. 1 | *AS4134* | AS40633 | ..(+4).. | AS6453 | AS9299 | AS18223 | India, Capital IQ Information Systems |
| 2011 Apr. 1 | | *AS3549* | AS5391 | AS25144 | AS42432 | AS8670 | Bosnia, University of Sarajevo |
| 2011 Apr. 1 | | *AS3549* | AS10026 | AS9957 | AS10036 | AS18334 | South Korea, Gyounggidongbu Cable TV |
| 2011 Aug. 15 | | *AS1273* | AS1299 | AS3491 | AS20485 | AS8402 | Russia, Vimpelcom |
| 2011 Dec. 1 | | *AS6762* | AS1133 | AS12695 | AS34123 | AS28738 | Russia, InterLAN Communications |

TABLE 2-continued

Remaining interception alerts after IRR inspection.

| Date | Forged AS path/nonuniform route segment | | | | | Victim | country/company |
|---|---|---|---|---|---|---|---|
| 2011 Dec. 15 | | *AS702* | AS701 | AS3549 | AS21371 | AS49669 | United Kingdom, Cognito |
| 2012 Sep. 15 | | *AS2828* | AS1299 | AS9498 | AS58459 | AS4613 | Nepal, Mercantile Office Systems |
| 2012 Nov. 1 | *AS30496* | AS11427 | AS7843 | AS6461 | AS33481 | AS40610 | United States, Digital Passage |
| 2012 Dec. 15 | *AS30496* | AS11427 | AS7843 | AS6461 | AS33481 | AS21854 | United States, Digital Passage |
| 2013 Feb. 15 | | *AS1273* | AS2914 | AS8928 | AS5391 | AS57888 | Croatia, Telesat |
| 2013 Jun. 1 | *AS1299* | AS6663 | ..(+3).. | AS6939 | AS197043 | AS197890 | Germany, Megaservers |
| 2013 Jul. 15 | | *AS3356* | AS1299 | AS6663 | AS41571 | AS48828 | Romania, Carosystem |
| 2013 Aug. 15 | *AS3549* | AS3491 | AS12880 | AS43343 | AS21341 | AS25306 | Iran, Institute IsIran |
| 2013 Dec. 1 | | *AS1299* | AS9498 | AS12880 | AS41881 | AS51411 | Iran, Toos-Ashena |
| 2015 Feb. 15 | | *AS1299* | AS52320 | AS16735 | AS28284 | AS262353 | Brazil, Marcelo Bonini |
| 2015 Jul. 15 | *AS3356* | AS209 | ..(+2).. | AS721 | AS27066 | AS747 | United States, US Army ISC |
| 2015 Aug. 15 | | *AS46450* | AS1299 | AS3356 | AS6079 | AS55079 | United States, Third Gear Networks | s: *ASN*
t: ASN
$w_v^a$: ASN . . . ASN

Case Studies

The empirical evidence presented so far cannot provide substantial proof for an attack without knowledge of the intended routing policies of the affected ASes. In the following, we take into account supplemental data to carry out case studies on two of the reported incidents.

Ground Truth: The DEFCON Attack (2008).

The attack performed at DEFCON was a well-known experiment to demonstrate interception attacks in practice. All details on the attack are publicly available and thus provide perfect ground truth for validating our detection scheme in CAIR.

Figure 5:
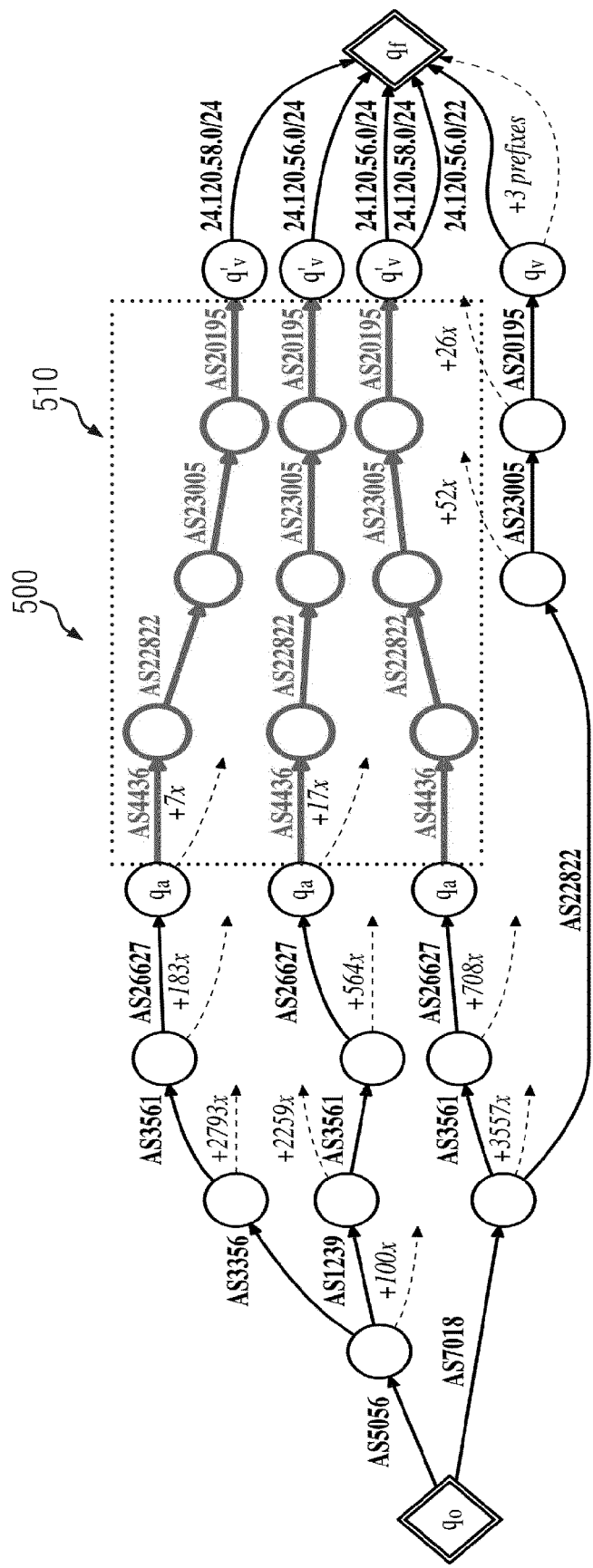
FIG. 5 shows an example route automaton for the DEFCON Attack (AS20195) on Aug. 10, 2008.

FIG. 5 shows the resulting route automaton 500 that corresponds to the alert raised by CAIR. The victim AS20195 (Sparkplug) initially advertised four distinct prefixes including 24.120.56.0/22. During the attack, two more specific prefixes (24.120.56.0/24 and 24.120.58.0/24) appeared to originate from this AS. With our automaton, we identified the artificial path segments (indicated by a dotted region 510). Note that none of the corresponding states within the region 510 showed any other outgoing transitions in contrast to the valid segment as indicated by dashed lines. We located the attacker at $q_a$. It is either AS26627 or a common customer of this AS and AS4436. Our observations fully complied with the public, verified information about the incident. The attacker was located at AS4436.

The Tehran Incident (2013).

Figure 6:
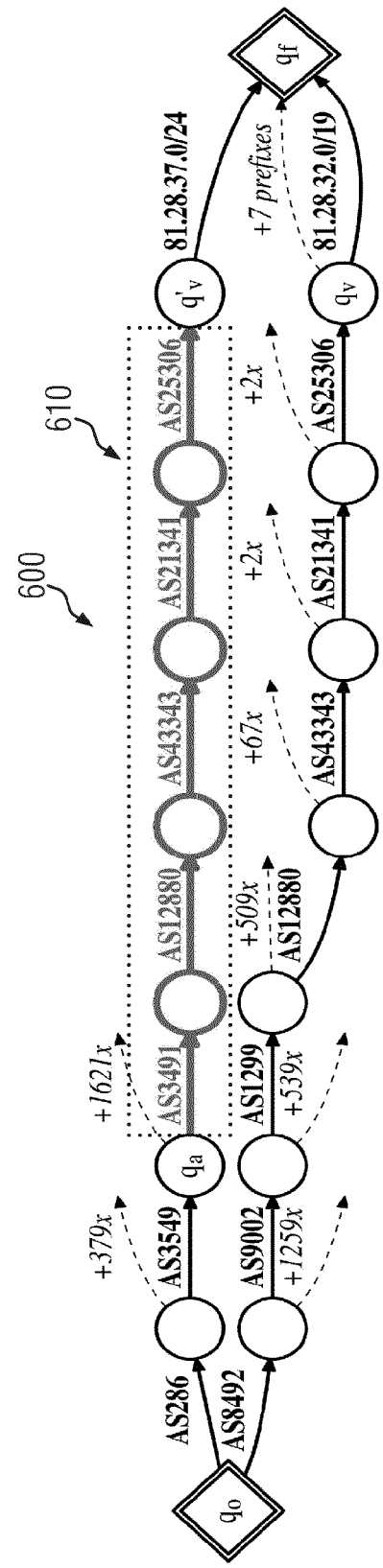
FIG. 6 shows an example route automaton for the Tehran Incident (AS25306) on Aug. 15, 2013.

Another interception alert of particular interest reported by CAIR affects AS25306 (INSTITUTE-ISIRAN IsIran). We refer to this event as the Tehran Incident. Compared to the DEFCON attack, the analysis of this incident was more challenging for two reasons. First, this incident has not been discussed in the public so far. Second, the attack took place in 2013, which makes verification based on additional data sets difficult. To begin with, FIG. 6 shows the corresponding automaton 600. On Aug. 15, 2013, AS25306 advertised eight prefixes including 81.28.23.0/19. At the same time, we observed an artificial path to the subprefix 81.28.37.0/24 (indicated by a dotted region 610). Within our route automaton we were able to localize the suspected attacker at the state $q_a$. We learned that he must be a common customer of both AS3549 (Level3) and AS3491 (Beyond the Network America—BTNA).

We searched operator mailing lists and forum platforms for further evidence. The incident itself was not reported. However, we found several abuse reports indicating that BTNA has been involved in other hijacking events, in which networks were taken over to send spam. Although these reports do not prove that the Tehran Incident was indeed an interception attack, they give further credibility to the assumption that the alarm triggered by CAIR was correct.

Analysis of Route Leaks

We reused our RouteViews data set and evaluated regular changes in the routing dominance $|\vec{Q}|$ of all ASes over the time frame of seven years. Contrary to intuition, this metric did not yield a particular high rank for the peers of the examined RouteViews collector. They exhibit an average rank of 3,808. The top-5 ASes ranked by $|\vec{Q}|$ are AS2914 (NM, AS3356 (Level3), AS3257 (Tinet), AS1299 (Telia), and AS174 (Cogent), which are all prominent tier-1 providers.

Changes in Routing Dominance.

Figure 7:
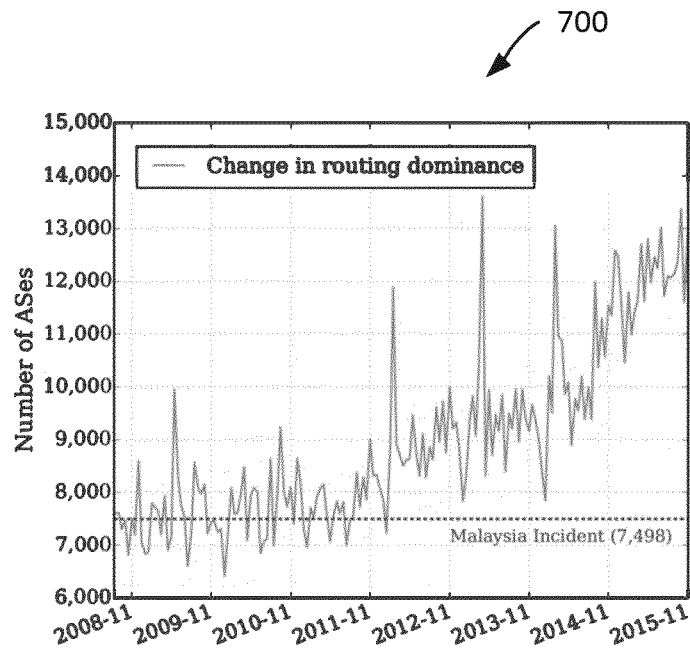
FIG. 7 is a plot of a number of routing changes by affected ASes over a period of time and for a route leak incident.

We compared the route automata for the RouteViews data set and computed the average number of ASes that experience a change in reachable states $|\vec{Q}|$. FIG. 7 presents the results in a plot 700 (showing a number of routing changes by affected ASes over a period of time and for a route leak incident). On average, we observed 9,019 ASes (19.61%) with such changes every two weeks. We compared these results to a recent route leak caused by AS4788 (Telekom Malaysia) and observed a change in routing dominance for 7,498 ASes (14.67%) in an interval of less than two hours.

Figure 8:
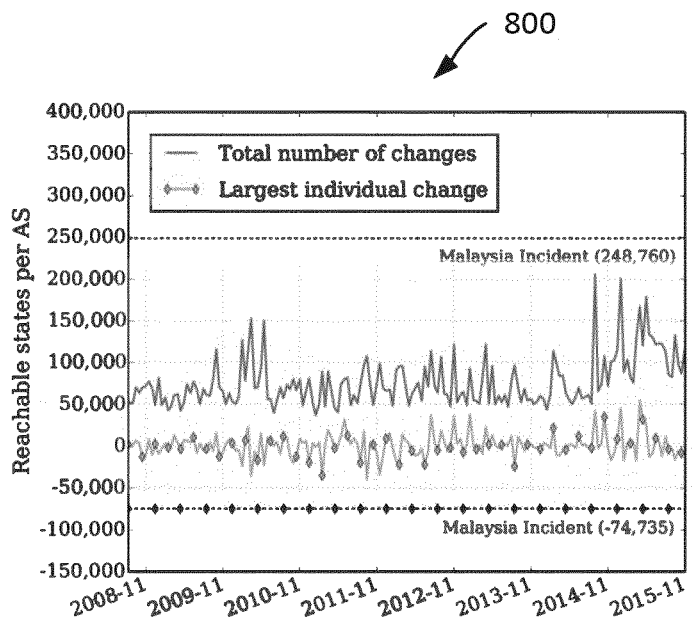
FIG. 8 is a plot of a number of reachable states per AS over a period of time and for a route leak incident.

FIG. 8 further shows the total amount of changes in $|\vec{Q}|$ over all ASes in a plot 800 (showing the number of reachable states per AS over a period of time and for a route leak incident). We saw an average of 76,785 states that were added to or removed from $\vec{Q}(u)$ for any $u \in \Sigma_{AS}$ in the intervals of two weeks. In addition, FIG. 8 illustrates the maximum and minimum changes imposed to a single AS. The largest individual increase of 54,402 newly reachable states (+133.25%) was attributed to AS3257 (Tinet). For AS2914 (NTT), we observed the largest decrease of 39,442 states (−67.86%). Both ISPs were counted among the tier-1 providers. It is reasonable to assume that such uncommon changes in routing dominance relate to a major shift in peering agreements between incumbent ISPs.

In contrast to that, the Malaysia route leak resulted in an immediate change in the reachability of 248,760 automaton states. Within two hours, AS577 (Bell Canada) lost reachability of 74,735 states (−98.57%). At the same time, the size of $|\vec{Q}|$ for Telekom Malaysia increased by 32,621 states (+2,239%). Such a significant and abrupt re-routing over a medium-sized AS is unprecedented during normal operations and can hardly be the result of a regular change in peering agreements. To confirm this assumption, we studied the route leak in more detail.

The Malaysia Route Leak (2015).

The incident started on Jun. 12, 2015 at 08:40 and began to gradually settle down about two hours later. We split the event into four intervals and utilize additional RouteViews data to construct corresponding route automata. For $T_2$-$T_3$ (08:00-10:00), we evaluated the top-10 ASes that exhibit the highest absolute change in reachable states $|\vec{Q}|$. We compared the results to the as-is state before and after the event, i.e., at $T_1$ (06:00) and $T_4$ (12:00). Note that the overall size of the automata moderately changed during the time frame of the route leak (−3.96% of states and −10.47% of transitions). Table 3 shows all corresponding results.

TABLE 3

ASes by amount of newly (un-)reachable states.
Malaysia Route Leak, Jun. 12, 2015.

| Top-10 ASes | $u \in \Sigma_{AS}$ | 06:00 ($T_1$) $|\vec{Q}_{T_1}(u)|$ | ongoing route leak 08:00 ($T_2$)-10:00 ($T_3$) $|\vec{Q}_{T_3}(u)| - |\vec{Q}_{T_2}(u)|$ | | 12:00 ($T_4$) $\vec{Q}_{T_4}(u)$ |
|---|---|---|---|---|---|
| 1. | AS577 | 75,811 | −74,735 | (−98.57%) | 75,660 |
| 2. | AS4788 | 1,555 | +32,621 | (+2,239%) | 1,412 |
| 3. | AS1267 | 32,514 | −32,218 | (−99.11%) | 32,541 |
| 4. | AS174 | 94,702 | −16,770 | (−17.73%) | 93,905 |
| 5. | AS3549 | 16,455 | +11,523 | (+71.03%) | 13,359 |
| 6. | AS3356 | 101,547 | −4,522 | (−4.45%) | 101,262 |
| 7. | AS6453 | 72,213 | −3,965 | (−5.48%) | 71,918 |
| 8. | AS6695 | 713 | +3,782 | (+531%) | 719 |
| 9. | AS2914 | 107,226 | −3,733 | (−3.48%) | 106,862 |
| 10. | AS1299 | 117,673 | −3,416 | (−2.90%) | 117,387 |

Most affected: AS577 Bell, AS1267 Wind, AS174 Cogent
Propagators: A54788 Telekom Malaysia, A53549 Level 3, AS6695 DE-CIX We saw the highest increase in reachable states $|\vec{Q}|$ for the publicly confirmed originator AS4788 and accordingly for his neighboring ASes AS3549 (Level3) and AS6695 (DE-CIX). This increase also correlated with higher inbound traffic, since the number of reachable states directly corresponds to the number of established transit routes over an AS. Note that AS6695 did not provide upstream connectivity under normal circumstances. Its high increase in dominant routes was rather an artifact: Telekom Malaysia peered with the public route servers at DE-CIX, which redistributed routes from 456 connected ASes to a total of 14,542 destination ASes. Apparently, AS4788 leaked these routes such that the AS path of corresponding BGP updates comprised AS6695. This was surprising since the route servers at the DE-CIX Internet Exchange Point operate transparently and hide their own AS.

The largest decrease in $|\vec{Q}|$ both in relative and absolute terms attributed to AS577. A similar observation could be made for AS1267 (Wind Telecomunicazioni) and also to some extent for AS174 (Cogent). Since the originator's routes were globally preferred during the incident, these ASes consequently lost a major part of their inbound traffic in exchange for an increase in outbound traffic towards AS4788. Note that only a smaller number of all ASes (14.67%) propagated routes towards AS47888; the greater part (85.33%) was affected outbound, i.e., only received corresponding routes. Within two hours after the event, global routing converged back to its original state.

Impact Analysis.

With CAIR, we are able to precisely identify the role of each party involved in a route leak. We already showed that only a moderate number of ASes is directly affected by re-routing, which in turn could be classified into groups that either gained or lost in reachable states $|\vec{Q}|$. The highest absolute change attributed to the originator of a route leak followed by his upstream ASes. Hence, we were able to identify catalyst upstreams that unwittingly propagate the leak. Note again that the measure $|\vec{Q}|$ directly correlated to the amount of traffic attracted by an AS. As a consequence, we could also assess the impact of a route leak on individual ISPs.

Discussion

We demonstrated the effectiveness of CAIR by showing that it can identify BGP policy violations for well-known incidents. We also showed that CAIR provides valuable information on such events both for mitigation and post-mortem analysis. In the following, we discuss practical issues such as the placement and number of observation points and potential causes for false positives. We also investigate suitable deployment scenarios.

Selection of Observation Points.

In general, CAIR does not depend on the selection of a specific set of observation points. Global interception attacks as well as major route leaks are visible in the default-free zone. However, our chances to detect targeted attacks or policy violations of limited scope depend on the possibility to observe competing routes. We suggest to operate CAIR with a larger set of well-connected BGP collectors such as the one we used in our evaluation.

Limitations of the Detection Schemes.

Given a narrow selection of observation points, false negatives could arise for events that only partially affect the global routing system. For this reason, we have excluded concurrent hijacking of same-sized prefixes from our interception analysis. Given sufficient input data, CAIR is generally able to detect these incidents. Interception attacks lead to observable policy violations (e.g., the attacked prefix is announced differently compared to the victim's original announcements).

False positives can be the result of contradictory routing policies that are intentionally deployed as such. To the greater extent, we can identify these cases by searching for sibling ASes involved in an event. If CAIR is deployed by individual ISPs, information about their intended routing policies is readily available and can be used to avoid false alarms. Due to convergence effects in BGP, we might further recognize policy violations during a temporary changeover or a permanent shift in peering agreements. We can mitigate such effects by operating CAIR on a continuous basis and adding a cooling period for alarms to be raised. Since CAIR detects divergent routing policies of any kind, prefixes under attack can be identified as long as the victim advertises them concurrently.

Modus Operandi.

CAIR can be deployed by individual AS operators as well as on larger scales to monitor the global routing table. In any case, CAIR does not require training of the data set. Our approach is extensible: It transforms any set of network routes into a route automaton, for which reasoning is defined by formal search patterns. CAIR can be operated as a stand-alone system, but it lends itself well to the integration with existing BGP monitoring techniques. We believe that it can be a valuable tool for ISPs and fellow researchers to model and analyze their routing data.

Enhancements.

Our minimization approach greatly reduces computational complexity as can be seen later on. We thus believe that CAIR is well-suited to monitor routing changes in real-time. In some cases, our model of network routes can be extended such that prefixes $p \subset \Pi$ are represented by a bit vector $p \in \{0,1\}^*$. This provides a more natural approach to study subprefix announcements. To obtain further evidence for attacks, we can also integrate active IP measurements into CAIR, which will allow us to correlate path deviations in the control-plane and the data-plane.

Additional Applications

We want to emphasize that CAIR is not solely a system for anomaly and hijacking detection, but a comprehensive framework to evaluate path data. Our intention is to lift routing analysis to a more formal, commonly-shared footing. In principle, any field of application that utilizes AS-level graphs can directly benefit from an integration with CAIR. Examples are discussed below.

Graph-Based Network Modeling.

Graphs of the Internet, and in particular AS-level graphs, oversimplify reality as ASes are neither atomic nor is there a clear notion of an edge between two AS nodes. CAIR is in line with these observations as it does not consider an AS as a single node but in the context of its abutting paths. It provides the flexibility to capture complex policy-based routing decisions.

More sophisticated modeling concepts such as multigraphs or hypergraphs as well as annotated nodes or links have been proposed, e.g., to impose economical constraints. A more fine-grained topological view based on so-called quasi-routers can be inferred from path data to model route diversity. BGP policy atoms support the analysis of prefix groups that share common routing paths. CAIR provides a natural generalization of these techniques by capturing all policy constraints that contribute to a given set of network paths. Other, less popular data structures exist to model network paths, e.g., tries. Later on, we show that CAIR outperforms them both in terms of expressiveness and efficiency.

Analysis of Routing Policies.

The Gao Rexford model is a good approximation for most AS relationships but does not hold in general. Inter-AS routing is more complex, e.g., with respect to partial transit. Prefix diversity has been analyzed recently by Anwar et al. CAIR fully reflects prefix-specific policies. Further, these observations are consistent with our assumption that an origin AS may advertise its prefixes differently but, in general, cannot influence export policies of an arbitrary distant AS.

A theoretical approach to policy-based routing has been introduced with Sobrinho's routing algebra. Subsequent work focused on abstract models of routing policies and their unification. The definition of finite route languages is consistent in itself and solely based on formal language theory. We assume, though, that a partial algebra defined over this language could be embedded into Sobrinho's routing algebra. Given the existence of such a link, we would be able to approach the theory of policy-based routing from an experimental point of view.

Detection of Routing Anomalies.

BGPsec provides cryptographic protection against forgery of AS paths but will not be deployed in the near future, stressing the need for protective monitoring. Common ways to detect and analyze routing anomalies are based on (i) control-plane information, (ii) data-plane measurements, or (iii) the combination of both. CAIR belongs to the first class. Current approaches that use control-plane data to detect interception attacks are challenged by the lack of a complete AS-level topology. Careful tuning of heuristic parameters is necessary to yield suitable detection results. CAIR, in contrast, is designed to cope with a limited number of observable routes as it explores contradictory routing properties therein.

The impact of interception attacks has been studied in detail using a next-hop signature and simulations. No decisive evidence for the discovered events could be found. A practical demonstration of an interception attack is given with the DEFCON attack. We use this ground truth data together with orthogonal data sources to validate some of the alerts raised by CAIR. Real-time detection has been proposed by leveraging a light-weight, distributed active measurement scheme. In principle, CAIR can be deployed for real-time analysis as well. It is a noninvasive technique that does not depend on active probing. Bogon route leaks have been studied in the past. Hira et al. argue that the prominent China Telecom incident was most likely a route leak because of missing evidence for subprefix hijacking. We complement these findings with a study of the Telekom Malaysia incident.

Path Query Languages.

Concepts of formal languages have already been applied in network analysis. Sibyl uses finite-state automata to implement search queries on measurement data based on regular expressions. Automata were also used to compile path queries for selective traffic monitoring and to construct routing filters. With CAIR, we utilize automata theory in a fundamentally different way: We construct an accurate representation of full routing tables. By minimizing the resulting route automata, structural routing properties are revealed.

Our primary focus is on the analysis of path-vector routing protocols such as BGP. The analysis of link-state protocols, however, could benefit from an integration with CAIR as well. Regular languages were used to construct an optimized forwarding graph for software-defined networks. CAIR could be a natural extension to this approach.

Additional Technical Details

For large volumes of input data such as a global set of routes in BGP, the construction of route automata is challenging. In the following, we describe our approach to minimization in CAIR and thoroughly quantify its performance. We show that the required resources for route automata are competitive with traditional network graphs and even decrease with more routes being added as an effect of the minimization. We further study the correlation between automata size and Internet growth.

Practical Aspects of CAIR

The incremental procedure to add a route to a given (possibly empty) route automaton is inspired by language processing and comprises three major steps. First, for each route the automaton is traversed along the longest common path segment, thereby ensuring that no invalid paths are introduced. Second, states that accept the remaining part of the route are newly created. The final step is to carry out an on-the-fly minimization while traversing the automaton in backward direction.

Notation.

A path segment $w \in \Sigma^*_{AS}$ with $r = w\vec{r} \in \mathcal{L}$, $|w| < |r|$ is denoted $w \prec r$. We define the longest common path segment $w_{tp}$ in M such that $$\forall r \in \mathcal{L}(M), w \prec r: |w_{tp}| \geq |w|, \delta^*(q_0, w_{tp}) \neq \bot.$$

$\mathcal{P}(\mathcal{L})$ holds all finite languages that represent (partial) routes. We define the right language of a state $q \in Q$ in M as $$\hat{\mathcal{L}}(q) = \{\vec{r} \in \mathcal{P}(\mathcal{L}) | \delta^*(q, \vec{r}) \in F\}.$$

In other words, $\hat{\mathcal{L}}: Q \to \mathcal{P}(\mathcal{L})$ maps the state q to the set of partial routes producible in the automaton M starting at q. Note that the language accepted by M can accordingly be defined as $\mathcal{L}(M) = \hat{\mathcal{L}}(q_0)$.

Incremental Construction Algorithm.

In the following, we present an in-depth description of the individual steps necessary to construct a minimal route automaton on-the-fly. During construction, we utilize a register of states $Q_R$, which is implemented as a hash table. Its keys represent unique right languages $\hat{\mathcal{L}}(q)$ for individual states $q \in Q$. This provides an efficient way to search for equivalent states, i.e., for states with identical right languages. Note that this particular approach expects an acyclic transition function $\delta^*$ such that $$\forall r \in \mathcal{L}(M): \nexists q \in Q: \delta^*(q, r) = q.$$

Hence, corresponding automata do not support languages where symbols or substrings repeatedly occur within a given string. We will see that this is no limitation in our context.

Step 1: Common Path Traversal.

To add a new route $r \in \mathcal{L}$ to M, we start at $q_0$ and traverse the automaton along a (possibly empty) sequence of existing states for the longest common path segment $w_{tp}$ in M. For so-called confluence states that have more than one incoming transition, we need to create a new state with identical outgoing transitions and link it to the last state traversed. This cloning process prevents inadvertently adding false paths (as is the case with traditional network graphs).

Step 2: Remaining Route Insertion.

After finding a specific state q that represents the longest common path segment $w_{tp}$, it is removed from the state register $Q_R$ since its right language is about to change. If the whole route is accepted in the first step, i.e., if $|w_{tp}| = |r|$, it is already contained in the automaton. Otherwise, we add new states for the remaining part of the route and link them with corresponding transitions. The last created state is marked as an accepting state.

Step 3: On-the-Fly Minimization.

Finally, we traverse the automaton in backward direction along the sequence of states that represent the newly inserted route r. For each state q, we search our register $Q_R$ for an equivalent state $\tilde{q}$ that already exists in M. If found, we discard q and link its preceding state to $\tilde{q}$. Otherwise, q is unique across all states of M and needs to be added to the register $Q_R$. Note that by traversing the automaton backwards, the comparison of right languages to identify existing equivalent states is reduced to a comparison of transitions, since recursive application would only yield the results of already compared states. Hence, it is sufficient for the keys in $Q_R$ to represent the transitions of individual states instead of their full right language. This greatly reduces computational complexity. Algorithm 1 provides a full specification of the construction algorithm in pseudo code.

---

Algorithm 1. Incremental construction of route automata.

Input: set of loop-free routes $\mathcal{L} \subset \Sigma^*_{AS} \times \mathcal{P}(\Pi)$ over the alphabet $\Sigma_{AS} \times \mathcal{P}(\Pi)$
Output: route automaton $M = (Q_R, \Sigma_{AS} \cup \mathcal{P}(\Pi), \delta, q_0, q_f)$ accepting all routes $r \in \mathcal{L}$

```
1     q_0 ← new_state( )        // start state
2     q_f ← new_state( )        // accepting state
3     Q_R ← { }                 // state register
4     δ ← { }                   // transition function
5     for r in L do
6         V_Q = [q_0]           // state vector
7         q_lp ← q_0
          // Step 1: Common path traversal
8         for i in 0..len(w_tp) − 1 do
9             q_i ← δ(q_lp, r[i])
              // Check for confluence states
10            if ∃q̄ ∈ Q_R, q̄ ≠ q_lp: δ(q̄, u) = q_i, u ∈ Σ_AS then
11                q_i ← clone_state(q_i)
12                δ ← δ ∪ {((q_lp, r[i]), q_i)}
13            V_Q ← V_Q + q_i
14            q_lp ← q_i
15        Q_R = Q_R \ {q_lp}
          // Step 2: Remaining route insertion
16        for j in len(w_tp)..len(r) − 1 do
17            q_j ← new_state( )
18            δ ← δ ∪ {((q_lp, r[j]), q_j)}
```

-continued

Algorithm 1. Incremental construction of route automata.

```
19            V_Q ← V_Q + q_j
20            q_{lp} ← q_j
              // Step 3: On-the-fly minimization
21        for k in len(V_Q) − 1..1 do
22            q_k = V_Q[k]
              // Check for equivalent states
23            if ∃q̂ ∈ Q_R, q̂ ≠ q_k: ℓ(q̂) = ℓ(q_k) then
24                δ ← δ \ {((V_Q[k − 1],r[k − 1]),q_k)}
25                δ ← δ ∪ {((V_Q[k − 1],r[k − 1]), q̂)}
26            Else
27                Q_R = Q_R ∪ {q_k}
```

Interestingly, by leaving out step 3, we obtain trie data structures. Beside redirection of transitions, this step only removes states from memory. As a consequence, route automata strictly outperform tries with respect to memory requirements and expressiveness due to the absence of redundancy. To summarize, our construction algorithm allows to randomly add or remove routes while ensuring minimality. CAIR is thus particularly well-suited for continuous monitoring of routing changes in BGP. We can also create and archive individual automata that represent the global routing system at specific points in time, a feature we used in our evaluation.

Solving Loops.

Our finite route language, and thus CAIR, accounts for the construction of any set of network routes consisting of nodes and links as long as the input is cycle-free. Even though most routing protocols such as BGP provide built-in support for loop prevention, loops can still be included in routing data. Network operators, for example, may decide to influence route selection by adding their own AS number multiple times to the AS path (AS path prepending). This is not a problem for our approach: A simple way to model subsequent occurrences of a particular AS o in M is to extend $\Sigma_{AS}$ by multiple instances $o_i \in \Sigma_{AS}$ with $i \in \{1, 2, \ldots\}$.

Performance Properties of CAIR

To study the performance of CAIR, we construct a route automaton using the BGP routing table export from the RouteViews Oregon2 collector on Nov. 1, 2015.

States and Transitions.

The RouteViews collector peers with 41 ASes that represent our set of observation points $P_{ore} \subset \Sigma^*_{AS}$. These peers advertise 600,216 IP prefixes $p \subset \Pi$ via 2,875,026 distinct AS paths $w \in \Sigma^*_{AS}$ that comprise 52,396 individual ASes $o \in \Sigma^*_{AS}$. The full set of routes known to the collector is thus given by $\mathcal{L}_{ore} \subset \{wp | w \in \Sigma^*_{AS}, p \subset \Pi\}$ and consists of $|\mathcal{L}_{ore}|=22,303,775$ routes.

The corresponding route automaton $M_{ore}$ accepts the finite route language $\mathcal{L}_{ore}$. It utilizes $|Q_{ore}|=302,598$ states and $|\delta_{ore}|=10,355,671$ transitions to hold the entire RIB export. As discussed above, CAIR can outperform a trie data structure holding the same information, which would require 73.71 times as many nodes and 2.15 times the amount of transitions. Our vanilla implementation in Python needs 18.4 minutes to parse the input data and 99.4 minutes to create the automaton; subsequent updates can be applied in real-time. An optimized C++ version is under development.

Comparison to Network Graphs.

Figure 9A:
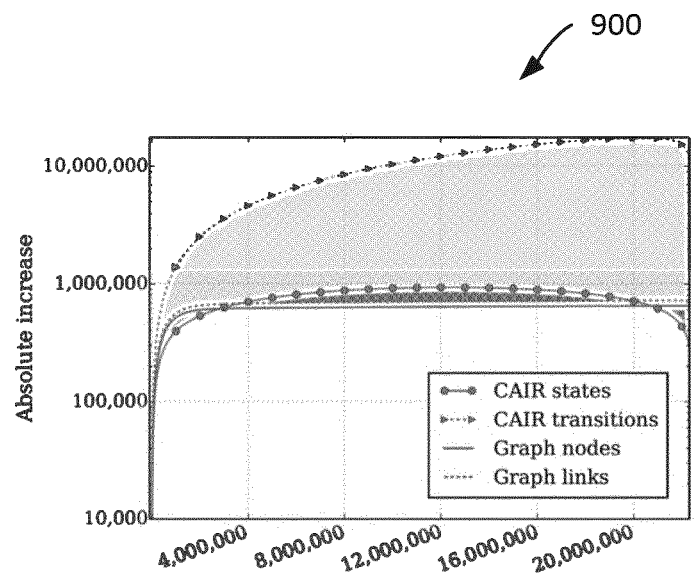
FIGS. 9A and 9B are plots of an example evolvement of states and transitions in CAIR and the network graph over a period of time.
Figure 9B:
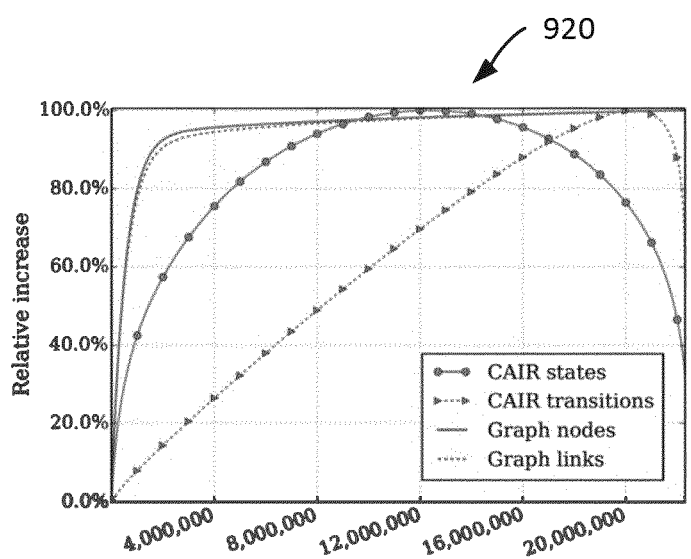

We define a network graph $\mathcal{G} =(N, L)$ as a set of nodes $N=\Sigma_{AS} \cup \mathcal{P}(\Pi)$ and a set of links $L \subset \Sigma_{AS} \times (\Sigma_{AS} \subset \mathcal{P}(\Pi))$. For the collector studied above, this results in a total number of $|N|=652,612$ nodes and $|L|=725,425$ links. In comparison, CAIR requires 46.37% of states and 14.28 times more transitions to represent the full routing table. Taking into account that CAIR holds all observed routes in contrast to mere AS links as represented by the graph, its efficiency is remarkably competitive. FIGS. 9A and 9B quantify the evolvement of states and transitions in CAIR and the network graph while consecutively importing new routes. FIG. 9A includes a plot 900 showing absolute changes in the number of states and transitions in CAIR and the network graph. FIG. 9B includes a plot 920 showing relative changes in the number of states and transitions in CAIR and the network graph.

Interestingly, the minimization approach in CAIR introduces self-adaptive optimization. While the graph data structure creates ≈90% of the required objects already after importing 10% of all routes of the input data set, CAIR grows slower. This nicely illustrates that the graph, in contrast to CAIR, does not learn additional information with additional routes being observed. Further, the amount of states decreases in CAIR significantly after adding 55% of the routes. This implies that adding further routes to the automaton can actually reduce its size, which is due to the minimization process getting more effective on larger volumes of input data. This finding is of particular interest with respect to applications of CAIR in real-time routing analysis.

Resource Requirements Depending on Internet Growth.

Figure 10:
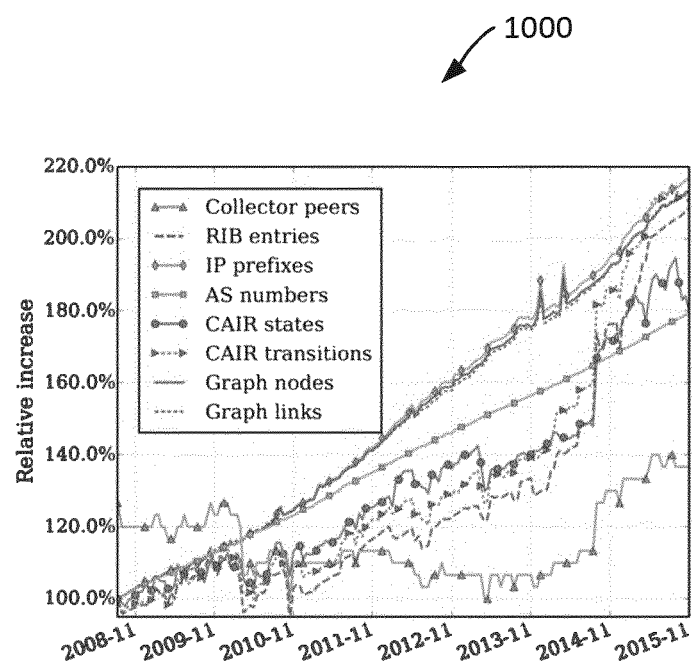
FIG. 10 is a plot of a relative evolution of routing information base (RIB) information content compared to resource requirements of CAIR and network graphs.

We now study retroactively the routing system at particular points in time. We use the RouteViews data as described above to construct different route automata in an interval of two weeks over the period of August, 2008 till November, 2015. FIG. 10 includes a plot 1000 showing the relative evolution of the RIB information content compared to resource requirements of CAIR and network graphs. Table 4 presents the corresponding absolute numbers of required resources. It is clearly visible that the graph depends mainly on the number of IP prefixes, i.e., the number of connected networks, whereas CAIR grows with the number of RIB entries, i.e., with the available path information.

TABLE 4

Objects created after importing RIB data.

|  | Aug. 10, 2008 | Nov. 1, 2015 |
| --- | --- | --- |
| RIB entries $|\mathcal{L}_{ore}|$ | 10,686,819 | 22,303,775 |
| IP prefixes $|\{p \subset \Pi\}|$ | 276,706 | 600,216 |
| AS numbers $|\Sigma_{AS}|$ | 29,203 | 52,396 |
| Unique AS paths $|\{w|wp \in \mathcal{L}\}|$ | 1,421,062 | 2,875,026 |
| CAIR states $|Q_{ore}|$ | 168,184 | 302,598 |
| CAIR transitions $|\delta_{ore}|$ | 4,939,314 | 10,355,671 |
| Graph nodes $|N_{ore}|$ | 305,909 | 652,612 |
| Graph links $|L_{ore}|$ | 339,515 | 725,425 |

Fields of Application

Our FRL concept and its implementation within CAIR can be applied to uniquely advance the following areas of computer networks.

Network Modeling

Formalization of Routing.

Modeling of any ordered sequence of nodes in a network, measured or formally derived from specification. Analysis of arbitrary routing data sets, network observations, and experiments.

Policy Modeling.

Formalization of routing policies, network security objectives, firewall rules, and dependency graphs. Assessment of compliance and policy violations, and deduction of threat models.

Practical Analysis of Routing Protocols.

Modeling and comparison of designed and observed routing characteristics. Empirical verification of protocol properties. Evaluation of performance and effectiveness, and target-performance comparisons.

Resilience and Recovery.

Assessment of routing resilience and failure tolerance. Impact analysis and evaluation of recovery strategies, disaster management, overprovisioning, and actors involved.

Failover and Prediction.

Assessment of failover techniques, emergency procedures, and concepts for backup routes. Prediction of routing changes, best-/worst-case scenarios, and what-if analyses.

Convergence and Stability.

Empirical analysis of routing protocol convergence, identification of stable and unstable equilibria, and equivalent routing states. Strategies for optimizing convergence times.

Mathematical Approach to Routing Experiments.

Analysis of the relation to mathematical routing theories, embedding of FRL models into other routing models.

AS-Level Routing Analysis

As Classification.

Assessment of the role of an AS in global Internet routing. AS classification with respect to routing importance and connectivity.

Type-of-Relationship.

Identification of the type of relationship between ASes, complex relationships, and ASes under same administrative control (sibling).

Peering and Transit Assessment.

Assessment of peering and transit agreements, identification of potential customers and suitable providers, business intelligence, and market observation. Evaluation of costs, risk-reward-ratios, and routing optimization at IXPs.

IP-Level Routing Analysis

IP Alias Resolution.

Identification of router IP addresses, (partially) unresponsive routers, and mapping of traceroute stars to IP addresses.

Identification of PoPs.

Mapping of multiple routers to particular routing sites, analysis of point-of-presences and data centers, interconnection, and failover.

Identification of IXPs.

Identification of IXP members and their peering policies. Benefits of public peering and assessment of multi-IXP strategies.

Analysis of Asymmetric Routing.

Modeling and analysis of bidirectional network paths. Evaluation of asymmetric routing. Detection and analysis of layer 2 routing, overlay networks, and peer-to-peer networks.

Anomaly Detection

Network Diagnosis.

Deduction and comparison of nominal network conditions, quality of service, and analysis of (unexpected) traffic flows.

Service Disruption.

Analysis of unreachable networks, sudden changes in connectivity, and temporary failures. Evaluation of preconditions and root causes. Best practices for prevention and mitigation strategies.

Routing Loops.

Modeling and detection of routing loops. Recommendations for troubleshooting and repairs, and proactive loop prevention.

Route Leaks.

Detection of route leaks of local and global scope. Impact analysis and identification of originator and multiplier ISPs. Suggestions for counter-measures and future prevention.

Hijacking Attacks.

Modeling and detection of hijacking attacks such as (sub-)prefix and AS hijacking, hidden takeover attacks, route diversion, and man-in-the-middle. Impact analysis and defensive measures.

Forensic Analysis.

Post-mortem analysis of past incidents, preconditions for attacks, and motivation and goals of an attacker.

Reactive Systems.

Development of early warning systems and reactive systems to counter attacks. Protection against hijacking attacks and traffic interception.

Control-Plane Enhancements

Software Routers.

Implementation of software routers for shortest path and link-state routing protocols. Specification of routing policies in software.

Path Signaling.

Modeling and analysis of signaling mechanisms in IP telephony (voice-over-IP), Multicast, MPLS, RSVP and Flowspec/Filterspec, and RTSP.

Simulation and Emulation.

Simulation of routing changes, what-if analyses, load tests, and new routing protocols. Emulation of routers for test beds and experiments. Protocol testing and comparison.

Software-Defined Networking.

Enhancements to SDN controllers, interface to SDN applications, and new traffic processing functions in SDN datapaths.

Example Processes

Figure 11:
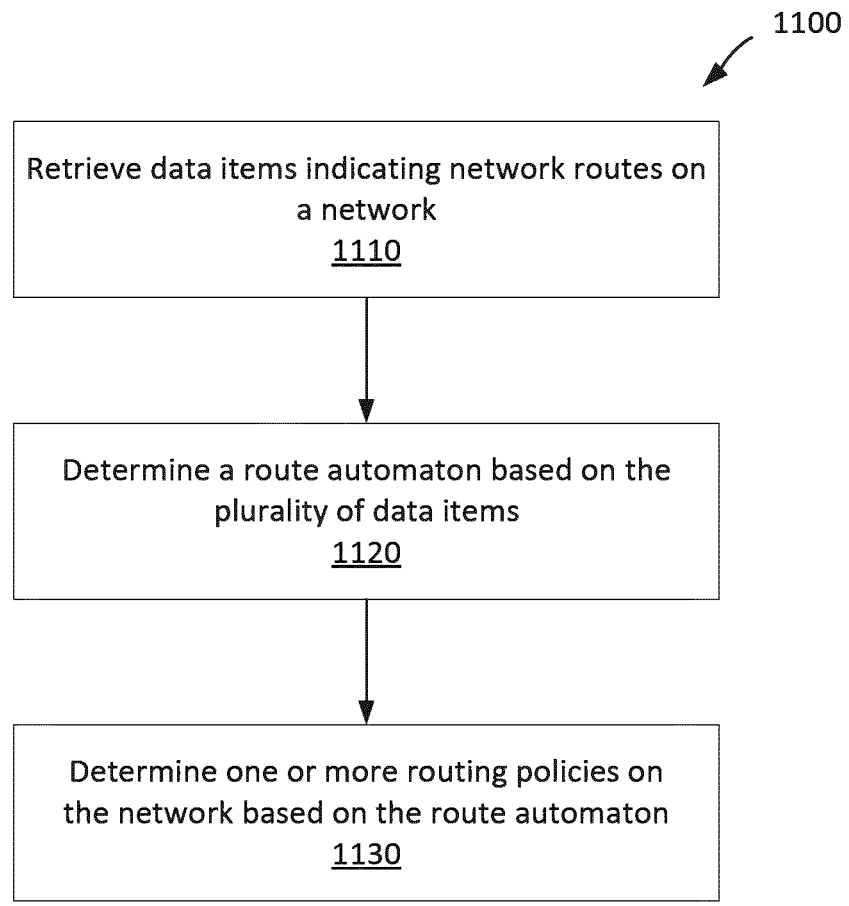
FIG. 11 is a flow chart diagram of an example process for detecting one or more routing policies on a network.

An example process 1100 for detecting one or more routing policies on a network is shown in FIG. 11. The process 1100 can be used, for example, to implement one or more of the CAIR-based features and techniques described herein.

In the process 1100, a plurality of data items is retrieved by a computer system (step 1110). Each data item indicates a respective network route on the network. For example, each data item can identify a particular route of network traffic through one or more ASes (e.g., in a similar manner as shown and described with respect to FIG. 1A).

In some cases, each data item can include an indication of a network prefix associated with a particular network route (e.g., a particular string of characters corresponding to a particular network prefix associated with a particular network route), and an indication of one or more ASes along the particular network route (e.g., one or more ASNs identifying one or more ASes along a particular network route). In some cases, each data item can include an indication of a particular destination Internet Protocol (IP) address associated with a particular network route, and an indication of one or more IP addresses of routers along the particular network route.

In some cases, data items can be retrieved by retrieving one or more network routing tables (e.g., routing information base (RIBs)) associated with the network. A network routing table could, for example, include a data table or record stored in a router or a networked computer that lists the routes to particular network destinations, and in some cases, metrics (e.g., distances) associated with those routes. The network routing tables can be retrieved, for example, from publicly available and/or third-party sources (e.g., from network service providers maintaining routers on the network). In some cases, data items can be retrieved by performing one or more IP-based measurements of the network (e.g., "active" network measurements to probe for one or more network routes and/or discover one or more network routes, as described herein).

The computer system determines a route automaton based on the plurality of data items (step 1120). The route automaton includes a representation of the network routes. In some cases, the route automaton can define a plurality of states (e.g., in the form of a state machine). Each state can be associated with a respective routing policy of an AS on the network. In some cases, each state can be associated with a respective routing policy of a router on the network. Example route automatons are depicted and described, for example, in FIGS. 1C, 1D, 3, 5, and 6.

In some cases, a route automaton can be determined by determining a deterministic finite-state automaton based on the plurality of data items. The deterministic finite-state automaton can include a plurality of states and a plurality of paths between the states. Further, a minimization operation can be performed with respect to the deterministic finite-state automaton. For example, in the deterministic finite-state automaton, two or more states associated with a similar routing policy can be combined. As another example, a number of states of the deterministic finite-state automaton can be reduced such that the deterministic finite-state automaton includes a minimum number of unique states necessary to represent each of the network routes. Example minimization techniques are described in greater detail herein.

The computer system determines one or more routing policies on the network based on the route automaton (step 1130). As an example, the computer system can determine the routing behavior one or more ASes and/or routers on the network, as described herein.

In some cases, the computer system can identify a malicious routing activity on the network. For example, as described herein, the computer system can identify an interception attack associated with at least one AS on the network. In some cases, an interception attack can correspond to a selective rerouting of network traffic by an AS with respect to a subset of network prefixes of the network. In some cases, an interception attack can correspond to a selective rerouting of network traffic by an AS with respect to a particular subset of network prefixes of the network.

In some cases, the route automaton can define a plurality of directional paths between the states. Further, malicious network activity on the network can be identified by identifying a particular network route associated with a sequence of n or greater states in which a single respective outgoing path extends from each state in the sequence. In some cases, malicious network activity on the network can be identified by identifying a sequence of three or greater states in which a single respective outgoing path extends from each state in the sequence (e.g., three states in sequence, four states in sequence, five states in sequence, etc.). As an example, in the route automaton shown in FIG. 3, the route automaton includes a sequence of four states $q_a$, $q'_t$, $q'_u$, and $q'_v$, in which a single respective outgoing path extends from each state in the sequence. This sequence can be indicative of a malicious activity on the network.

Other thresholds for n are also possible. For example, in some cases, malicious network activity on the network can be identified by identifying a sequence of four or greater states in which a single respective outgoing path extends from each state in the sequence, or according to some other threshold (e.g., two or more such states, five or more such states, six or more such states, etc.)

Further, in some cases, a particular AS associated with the malicious network activity can be identified based on the route automaton. For example, one or more ASes can identified as engaging in, or facilitating the malicious network activity. Techniques for identifying or "pinpointing" one or more ASes in this manner are described in greater detail herein.

In some cases, the computer system can represent the plurality of network routes using a finite route language. As described herein, a finite route language can include a plurality of different symbols, and each particular network route can be represented by a corresponding word of the finite route language. A word can be defined, for example, by a sequence of symbols of the finite route language. In some cases, each symbol in the finite route language can indicate a particular network prefix, a particular AS, and/or a particular IP address of a device on the network, either directly (e.g., by expressly reciting a network prefix, an AS, and/or an IP address) or indirectly (e.g., by using one or more characters to represent a network prefix, an AS, and/or an IP address).

The process 1100 can provide various technical benefits. For example, implementations of the process 1100 can enable a computer network to operate more efficiently and more securely. To illustrate, implementations of the process 1100 can be used to identify one or more routing policies of a network (e.g., to identify the routing policies of one or more ASes or routers on the network) and/or to detect potential problems on the network (e.g., to detect the occurrence of malicious activities on the network, such as interception attacks). Based on this information, potential problems on the computer network can be more readily corrected and/or mitigated. For example, based on this information, a malicious party can be identified to authorities (e.g., to initiate criminal investigation and prosecution). As another example, compromised devices (e.g., network devices that have been hijacked by a malicious user to reroute network traffic improperly) can be identified, and reverted to their uncompromised states. As another example, network traffic can be rerouted around problematic devices, such that it is not intercepted by a malicious party. Thus, the computer network can operate in a more secure and efficient manner.

Example Computer Systems

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the process 1100 shown in FIG. 11 can be implemented, at least in part, using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 12:
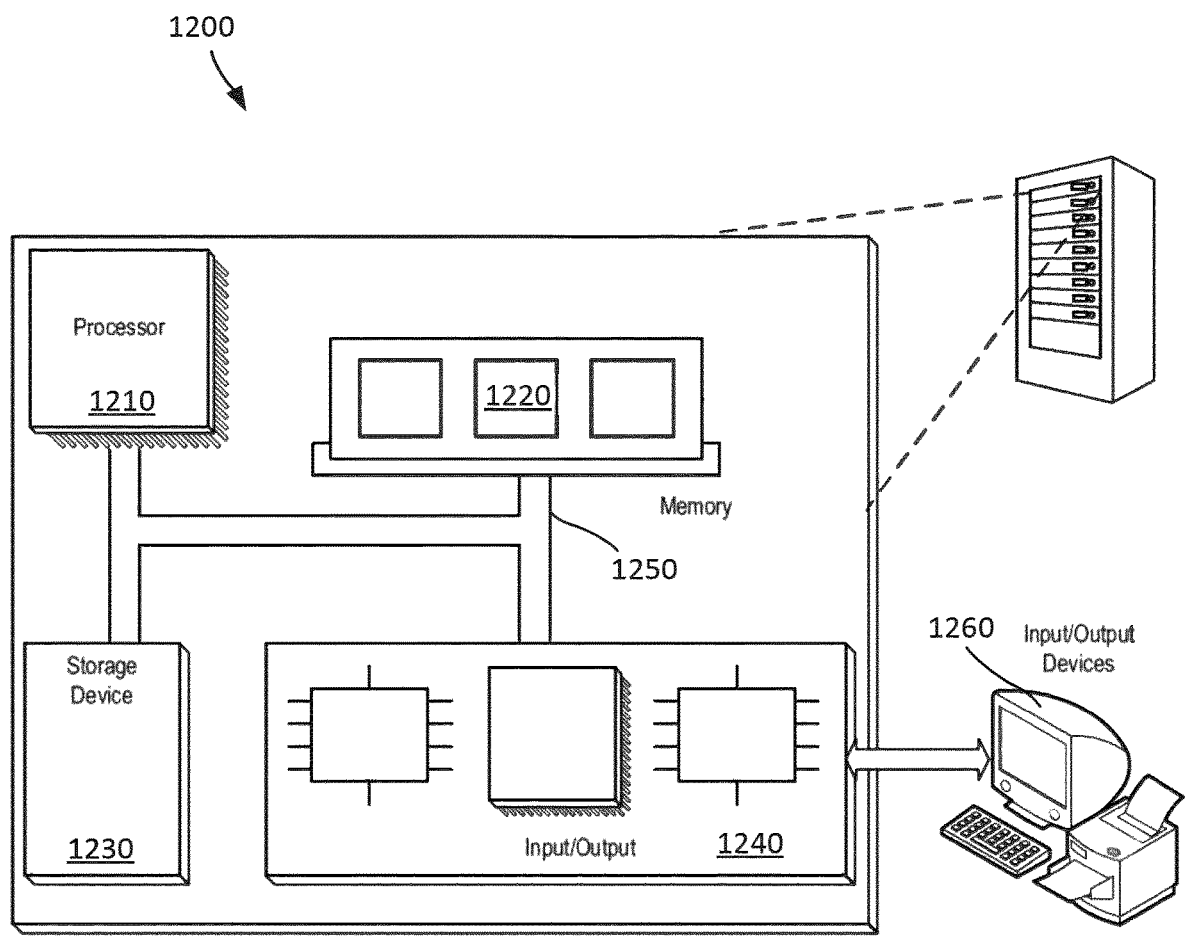
FIG. 12 is a diagram of an example computer system.

FIG. 12 shows an example computer system 1200 that includes a processor 1210, a memory 1220, a storage device 1230 and an input/output device 1240. Each of the components 1210, 1220, 1230 and 1240 can be interconnected, for example, by a system bus 1250. The processor 1210 is capable of processing instructions for execution within the system 1200. In some implementations, the processor 1210 is a single-threaded processor, a multi-threaded processor, or another type of processor. The processor 1210 is capable of processing instructions stored in the memory 1220 or on the storage device 1230. The memory 1220 and the storage device 1230 can store information within the system 1200.

The input/output device 1240 provides input/output operations for the system 1200. In some implementations, the input/output device 1240 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 1260. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

CONCLUSION

In this disclosure, we introduced CAIR, a framework to study routing policies based on path data in BGP. Our approach borrows concepts from formal languages and is designed to preserve route diversity. It solves the transitivity problem of traditional network graphs, where routes from $AS_1 \rightarrow AS_2$ and $AS_2 \rightarrow AS_3$ in general do not imply a route $AS_1 \rightarrow AS_2 \rightarrow AS_3$. With finite route languages, we provide a comprehensive formalization where routing properties can be rigorously described. Minimized route automata allow to reveal routing policies that determine a given set of network paths. CAIR can be used to study policy violations therein and offers unique benefits in terms of efficiency and expressiveness.

We formalized a sophisticated interception attack in BGP and translated it into a practical search pattern for CAIR. We also developed an analytical scheme for route leaks. An evaluation of BGP routing data of more than seven years demonstrated the potential of CAIR for practical use: We gained insight into normal and abnormal routing changes, studied a known route leak incident in great detail, and identified 22 cases of potential interception attacks. CAIR is a versatile tool for ISPs to study the propagation of their network routes. We further showed that its applicability goes well beyond the detection of routing anomalies, offering the potential to improve on a variety of existing routing analyses.

A number of embodiments have been described. Nevertheless, it will be understood that various modifications may be made without departing from the spirit and scope of the invention. Accordingly, other embodiments are within the scope of the following claims.

The invention claimed is:

1. A method of detecting one or more routing policies in use in a network including a plurality of network devices, the method comprising:
   identifying, by a computer system, a plurality of network routes, wherein each network route indicates a path by which data packets can traverse the network, the path including a subset of the plurality of network devices;
   determining, by the computer system, a route automaton based on the plurality of network routes, wherein the route automaton is a finite-state machine that defines one or more states and one or more transitions between the states, wherein the route automaton represents network routes along inter-domain routing, and wherein determining the route automaton comprises:
      determining a deterministic finite-state automaton based on the plurality of network routes, wherein the deterministic finite-state automaton comprises a plurality of states and a plurality of paths between the states, and wherein each state is associated with a routing policy associated with a particular network device on the network;
      performing a minimization operation with respect to the deterministic finite-state automaton, including combining two or more states associated with a similar routing policy, and reducing a number of states of the deterministic finite-state automaton such that the deterministic finite-state automaton includes a minimum number of unique states necessary to represent each of the network routes;
   determining, by the computer system, one or more routing policies on the network based on said route automaton;
   identifying, by the computer system, a routing anomaly occurring on the network based on the one or more routing policies, wherein the routing anomaly is associated with one or more affected devices from the plurality of network devices, and wherein identifying the routing anomaly occurring on the network comprises identifying, by a software implementation of the route automaton executed by a processor of the computer system, non-uniform routing decisions on the network; and
   providing, by the computer system, an identification of the routing anomaly and the affected devices to an administrative entity associated with the network.

2. The method of claim 1, wherein identifying the routing anomaly occurring on the network comprises identifying a malicious routing activity on the network.

3. The method of claim 2, wherein identifying the malicious routing activity on the network comprises identifying an interception attack associated with at least one autonomous system on the network.

4. The method of claim 3, wherein the interception attack corresponds to a selective rerouting of network traffic by an autonomous system with respect to a subset of network prefixes of the network.

5. The method of claim 1, wherein each network route comprises:
   an indication of a network prefix associated with the particular network route; and
   an indication of one or more autonomous system along the particular network route.

6. The method of claim 1, wherein each network route comprises:
   an indication of a destination Internet Protocol (IP) address associated with the particular network route; and
   an indication of one or more IP addresses of routers along the particular network route.

7. The method of claim 1, wherein identifying the plurality of network routes comprises retrieving one or more network routing tables associated with the network.

8. The method of claim 1, wherein identifying the plurality of network routes comprises performing one or more IP-based measurements of the network.

9. The method of claim 1, wherein the route automaton defines a plurality of states, wherein each state is associated with a respective routing policy of an autonomous system on the network.

10. The method of claim 1, wherein the route automaton defines a plurality of states, wherein each state is associated with a respective routing policy of a router on the network.

11. The method of claim 1, further comprising:
representing the plurality of network routes as a finite route language,
wherein the finite route language comprises a plurality of symbols present in a global routing system, wherein the symbols comprising at least one of:
an indication of a network prefix,
an indication of an autonomous system, or
an indication of an IP address
wherein a particular network route is represented by a word of the finite route language, the word being defined by a sequence of symbols of the finite route language.

12. The method of claim 2, wherein the route automaton defines a plurality of directional paths between the states,
wherein identifying the malicious routing activity on the network comprises identifying a particular network route associated with a sequence of n or greater states, wherein a single respective outgoing path extends from each state in the sequence, and
wherein n is at least three.

13. The method of claim 2, further comprising identifying a particular autonomous system associated with the malicious routing activity based on the route automaton.

14. A system, comprising:
one or more processors; and
non-transitory computer readable medium storing instructions operable to cause one or more processors to perform operations comprising:
identifying, by a computer system, a plurality of network routes, wherein each network route indicates a path by which data packets can traverse the network, the path including a subset of the plurality of network devices;
determining, by the computer system, a route automaton based on the plurality of network routes, wherein the route automaton is a finite-state machine that defines one or more states and one or more transitions between the states, wherein the route automaton represents network routes along inter-domain routing, and wherein determining the route automaton comprises:

determining a deterministic finite-state automaton based on the plurality of network routes, wherein the deterministic finite-state automaton comprises a plurality of states and a plurality of paths between the states, and wherein each state is associated with a routing policy associated with a particular network device on the network;

performing a minimization operation with respect to the deterministic finite-state automaton, including combining two or more states associated with a similar routing policy, and reducing a number of states of the deterministic finite-state automaton such that the deterministic finite-state automaton includes a minimum number of unique states necessary to represent each of the network routes;

determining, by the computer system, one or more routing policies on the network based on said route automaton;

identifying, by the computer system, a routing anomaly occurring on the network based on the one or more routing policies, wherein the routing anomaly is associated with one or more affected devices from the plurality of network devices, and wherein identifying the routing anomaly occurring on the network comprises identifying, by a software implementation of the route automaton executed by a processor of the computer system, non-uniform routing decisions on the network; and providing, by the computer system, an identification of the routing anomaly and the affected devices to an administrative entity associated with the network.

\* \* \* \* \*